US011967776B2

(12) United States Patent
Scarborough et al.

(10) Patent No.: US 11,967,776 B2
(45) Date of Patent: Apr. 23, 2024

(54) LENS ANTENNA SYSTEM

(71) Applicant: All.Space Networks Limited, Reading (GB)

(72) Inventors: Clinton P. Scarborough, Darlington, MD (US); Jeremiah P. Turpin, Linthicum, MD (US); Daniel F. DiFonzo, Rockville, MD (US); John Finney, London (GB)

(73) Assignee: All.Space Networks Limited, Reading (GB)

( * ) Notice: Subject to any disclaimer, the term of this patent is extended or adjusted under 35 U.S.C. 154(b) by 0 days.

(21) Appl. No.: 18/496,626

(22) Filed: Oct. 27, 2023

(65) Prior Publication Data

US 2024/0063541 A1 Feb. 22, 2024

Related U.S. Application Data

(63) Continuation of application No. 16/726,342, filed on Dec. 24, 2019, which is a continuation of application (Continued)

(51) Int. Cl.

*H01Q 3/46* (2006.01)
*H01Q 1/28* (2006.01)
*H01Q 3/14* (2006.01)
*H01Q 3/24* (2006.01)
*H01Q 3/30* (2006.01)
(Continued)

(52) U.S. Cl.

CPC ............... *H01Q 3/46* (2013.01); *H01Q 1/288* (2013.01); *H01Q 3/14* (2013.01); *H01Q 3/245* (2013.01); *H01Q 3/30* (2013.01); *H01Q 19/062* (2013.01); *H01Q 21/0025* (2013.01); *H01Q 21/061* (2013.01); *H01Q 21/22* (2013.01); *H01Q 25/007* (2013.01); *H01Q 1/241* (2013.01)

(58) Field of Classification Search

CPC .................................. H01Q 3/14; H01Q 3/46
See application file for complete search history.

(56) References Cited

U.S. PATENT DOCUMENTS 4,071,848 A * 1/1978 Leeper .................. H01Q 21/22 343/844
4,332,018 A 5/1982 Sternberg et al.
(Continued)

FOREIGN PATENT DOCUMENTS

JP H09-8534 A 1/1997
JP 2000-022423 A 1/2000
(Continued)

OTHER PUBLICATIONS

Afanasyev et al., Multi-beam Luneburg Lens Antenna for Cellular Communications. 9th European Conference on Antennas and Propagation (EuCAP). Lisbon. 2015. 4 Pages.
(Continued)

*Primary Examiner* — Graham P Smith
(74) *Attorney, Agent, or Firm* — Wolf, Greenfield & Sacks, P.C.

(57) ABSTRACT

An antenna system that includes a plurality of lens sets. Each lens set includes a lens and at least one feed element. At least one feed element is aligned with the lens and configured to direct a signal through the lens at a desired direction.

17 Claims, 8 Drawing Sheets

Related U.S. Application Data

No. 16/173,985, filed on Oct. 29, 2018, now Pat. No. 10,553,947, which is a continuation of application No. 15/722,561, filed on Oct. 2, 2017, now Pat. No. 10,116,051.

(60) Provisional application No. 62/472,991, filed on Mar. 17, 2017.

(51) Int. Cl.

| | |
|---|---|
| ***H01Q 19/06*** | (2006.01) |
| ***H01Q 21/00*** | (2006.01) |
| ***H01Q 21/06*** | (2006.01) |
| ***H01Q 21/22*** | (2006.01) |
| ***H01Q 25/00*** | (2006.01) |
| *H01Q 1/24* | (2006.01) |

(56) References Cited

U.S. PATENT DOCUMENTS

| | | | | |
|---|---|---|---|---|
| 4,499,473 | A | 2/1985 | Rao | |
| 4,845,507 | A | 7/1989 | Archer et al. | |
| 5,283,587 | A | 2/1994 | Hirshfield et al. | |
| 5,436,453 | A | 7/1995 | Chang et al. | |
| 5,457,465 | A | 10/1995 | Collier et al. | |
| 5,821,908 | A | 10/1998 | Sreenivas | |
| 5,856,804 | A | 1/1999 | Turcotte et al. | |
| 6,133,887 | A | 10/2000 | Tanizaki et al. | |
| 6,188,360 | B1 * | 2/2001 | Kato | H01P 7/10 343/846 |
| 7,605,768 | B2 | 10/2009 | Ebling et al. | |
| 8,518,537 | B2 | 8/2013 | Mattisne | |
| 9,728,860 | B2 | 8/2017 | Mattisine et al. | |
| 10,116,051 | B2 | 10/2018 | Scarborough et al. | |
| 10,211,540 | B2 | 2/2019 | Roitberg et al. | |
| 10,256,537 | B2 | 4/2019 | Besoli et al. | |
| 10,553,943 | B2 | 2/2020 | Tran | |
| 10,553,947 | B2 | 2/2020 | Scarborough et al. | |
| 10,693,210 | B2 * | 6/2020 | Chattopadhyay | H01Q 15/08 |
| 10,959,110 | B2 | 3/2021 | Linehan | |
| 2008/0238795 | A1 | 10/2008 | Alamouti et al. | |
| 2016/0172767 | A1 | 6/2016 | Ray | |
| 2017/0040705 | A1 | 2/2017 | Matitsine et al. | |
| 2017/0040706 | A1 | 2/2017 | Matitsine et al. | |
| 2017/0062944 | A1 | 3/2017 | Zimmerman et al. | |
| 2018/0269576 | A1 | 9/2018 | Scarborough et al. | |
| 2019/0074588 | A1 | 3/2019 | Scarborough et al. | |
| 2020/0144719 | A1 | 5/2020 | Scarborough et al. | |

FOREIGN PATENT DOCUMENTS

| | | | | |
|---|---|---|---|---|
| JP | 2000-196345 | A | 7/2000 | |
| WO | WO-2010016799 | A1 * | 2/2010 | H01Q 15/08 |
| WO | WO 2018/048520 | A1 | 3/2018 | |
| WO | WO 2018/132511 | A1 | 7/2018 | |

OTHER PUBLICATIONS

Bor et al., Foam Based Luneburg Lens Antenna at 60GHz. Progress In Electromagnetics Research Letters.2014;44:1-7.

Bor et al., Light, and Cheap flat foam-based Luneburg Lens Antenna. 8th European Conference on Antennas and Propagation (EuCAP).2014 5 Pages.

Decision Granting Institution of Inter Partes Review. *Masting, Inv.* v. *Isotropic Systems, Inc.* IPR Case No. IPR2022-01108/ U.S. Pat. No. 10,533,947 B2. Dec. 14, 2022.

Declaration of Anthony Teillet in support of Petitioner's Reply to Patent Owner's Response. *Masting, Inv.* v. *Isotropic Systems, Inc.* IPR Case No. IPR2022-01108/ U.S. Pat. No. 10,533,947 B2. May 31, 2022.

Declaration of Anthony Teillet. *Masting, Inv.* v. *Isotropic Systems, Inc.* IPR Case No. IPR2022-01108/ U.S. Pat. No. 10,533,947 B2. May 26, 2022.

Declaration of Gabriel M. Rebeiz. *Masting, Inv.* v. *Isotropic Systems, Inc.* IPR Case No. IPR2022-01108/ U.S. Pat. No. 10,533,947 B2. Sep. 12, 2022.

Declaration of Nader Behdad, PhD. *Masting, Inv.* v. *Isotropic Systems, Inc.* IPR Case No. IPR2022-01108/ U.S. Pat. No. 10,533,947 B2. Mar. 8, 2023.

Demetriadou et al., Slim Luneburg lens for antenna applications. Optics Express. Oct. 10, 2011;19(21):19925-34.

Deposition of Nader Behdad. *Masting, Inv.* v. *Isotropic Systems, Inc.* IPR Case No. IPR2022-01108/ U.S. Pat. No. 10,533,947 B2. Apr. 20, 2023.

Dixon, "A Broadband, High-Gain, Steerable Luneburg Lens," In-Building Wireless Antennas. Applied Microwave & Wireless.Jan. 2002; 14:66-70.

Elsherbiny, et al., Holographic Antenna Concept, Analysis, and Parameters. IEEE Transactions on Antennas and Propagation, vol. 52. No. 3, Mar. 2004, pp. 830-839.

Evans, Simple forms for equations of rays in gradient-index lenses. American Journal of Physics. 1990; 58:773-78. 10.1119/1.16357.

Extended European Search Report dated Apr. 20, 2018, in connection with European Application No. 17196795.3.

Fuchs et al., Design Optimization of Multishell Luneburg Lenses. IEEE Transactions on Antennas and Propagation. Feb. 2007.55(2):283-89.

Gregory et al., Fast Optimization of Electromagnetic Design Problems Using the Covariance Matrix Adaptation Evolutionary Strategy. IEEE Transactions on Antennas and Propagation. Apr. 2011;59(4):1275-85. doi: 10.1109/TAP.2011.2109350.

Gregory, et al., Exploiting Rotational Symmetry for the Design of Ultra-Wideband Planar Phased Array Layouts. IEEE Transactions on Antennas and Propagation, vol. 61, No. 1, Jan. 2013, pp. 176-184.

Hadka et al., Borg: An Auto-Adaptive Many-Objective Evolutionary Computing Framework. Evolutionary Computation. 2013;21(2):231-59.

International Search Report and Written Opinion dated Dec. 17, 2019, in connection with International Application No. PCT/IB2019/057947.

International Search Report and Written Opinion dated May 3, 2018, in connection with International Application No. PCT/IB2018/051752.

Japanese Office Action dated Jan. 29, 2019, for JP Application No. 2017-233638.

Kot et al., A Spherial Lens for the SKA. Experimental Astronomy. An International Journal on Astronomical Instrumentation and Data Analysis. 2004;17(1-3):141-48.

Kwon et al., Transformation optical designs for wave collimators, flat lenses, and right-angle bends. New Journal of Physics. Nov. 27, 2008;10(11). 13 Pages.

Lee et al., Antenna Handbook. Theory, Applications and Design. 1988. Springer Science. 8 Pages. DOI: 10.1007/978-1-4615-6459-1.

Li, et al., Beam Scanning Array Based on Luneburg Lens. IEEE, 2014, pp. 1274-1275.

Li, et al., Luneburg Lens with Extended Flat Focal Surface for Electronic Scan Applications. Optics Express, vol. 24, No. 7, Mar. 25, 2016; 11 pages.

Liang et al., A 3-D Luneburg Lens Antenna Fabricated by Polymer Jetting Rapid Prototyping. IEEE Transactions on Antennas and Propagation. Apr. 4, 2014;62(4):1799-1807.

Mateo-Segura et al., Flat Luneburg Lens via Transformation Optics for Directive Antenna Applications. IEEE Transactions on Antennas and Propagation, vol. 62, No. 4, Apr. 2014, pp. 1945-1953.

Matytsine et al., Large Size, Lightweight, Luneburg Lenses for Multi-beam Antenna Applications. 6th European Conference on Antennas and Propagation (EUCAP).2012.38 Pages.

Merchand. Gradient Index Optics. Elsevier. 2012.

Moore et al., Multiobjective particle swarm optimization. Proceedings of the $38^{th}$ annual on Southeast regional conference. ACM. 2000. pp. 56-57.

(56) References Cited

OTHER PUBLICATIONS

Morgan et al, Transformation-optics-inspired anti-reflective coating design for gradient index lenses. Opt Lett. Jun. 1, 2015;40(11):2521-4. doi: 10.1364/OL.40.002521.
Mosallaei. Nonuniform Luneburg and Two-Shell Lens Antennas: Radiation Characteristics and Design Optimization. IEEE Transactions on Antennas and Propagation. Jan. 2021;49(1):60-9.
Napier, et al., The Very Large Array: Design and Performance of a Modern Synthesis Radio Telescope. Proceedings of the IEEE, vol. 71, No. 11, Nov. 1983, pp. 1295-1300.
Notice of Filing Patent Owner's Demonstratives. *Matsing, Inc.* v. *All.Space Networks, Ltd. f/k/a Isotropic Systems, Ltd.* IPR Case No. IPR2022-01108/ U.S. Pat. No. 10,533,947 B2. Sep. 11, 2023.
Notice of Petitioner's Demonstratives. *Masting, Inv.* V. *Isotropic Systems, Inc.* IPR Case No. IPR2022-01108/ U.S. Pat. No. 10,533,947 B2. Sep. 11, 2023.
Notification on The Results of Examination of Patentability of Invention, issued in RU Application No. 2019126577/28 dated Feb. 2, 2022.
Patent Owner Preliminary Response to Petition for Inter Partes Review. *Masting, Inv.* v. *Isotropic Systems, Inc.* IPR Case No. IPR2022-01108/ U.S. Pat. No. 10,533,947 B2. Sep. 20, 2022.
Patent Owner's Demonstrative Exhibits. *Matsing, Inc.* v. *All.Space Networks, Ltd. f/k/a Isotropic Systems, Ltd.* IPR Case No. IPR2022-01108/ U.S. Pat. No. 10,533,947 B2. Sep. 8, 2023.
Patent Owner's Objections to Evidence. *Masting, Inv.* v. *Isotropic Systems, Inc.* IPR Case No. IPR2022-01108/ U.S. Pat. No. 10,533,947 B2. Dec. 29, 2022.
Patent Owner's Response. *Masting, Inv.* v. *Isotropic Systems, Inc.* IPR Case No. IPR2022-01108/ U.S. Pat. No. 10,533,947 B2. Mar. 8, 2023.
Patent Owner's Sur-Reply. *Masting, Inv.* v. *Isotropic Systems, Inc.* IPR Case No. IPR2022-01108/ U.S. Pat. No. 10,533,947 B2. Jul. 12, 2023.
Pendry et al., Controlling electromagnetic fields. Science. Jun. 23, 2006;312(5781):1780-2. DOI: 10.1126/science.1125907. Epub May 25, 200.
Petition for Inter Partes Review. *Matsing, Inc.* v. *All.Space Networks, Ltd. f/k/a Isotropic Systems, Ltd.* IPR Case No. IPR2022-01108/ U.S. Pat. No. 10,533,947 B2. Oct. 23, 2023.
Petitioner's Reply to Patent Owner's Response. *Masting, Inv.* v. *Isotropic Systems, Inc.* IPR Case No. IPR2022-01108/ U.S. Pat. No. 10,533,947 B2. May 31, 2023.
Petitioner's Demonstratives. *Matsing, Inc.* v. *All.Space Networks, Ltd. f/k/a Isotropic Systems, Ltd.* IPR Case No. IPR2022-01108/ U.S. Pat. No. 10,533,947 B2. Sep. 11, 2023.
Rahmat-Samii, Genetic Algorithm (GA) and Particle Swarm Optimization (PSO) in Engineering Eletromagnetics. IEEE Applied Electromagnetics and Communications. Oct. 1-3, 2003. 5 Pages.
Remote Deposition of Anthony Teillet. *Masting, Inv.* v. *Isotropic Systems, Inc.* IPR Case No. IPR2022-01108/ U.S. Pat. No. 10,533,947 B2. Jun. 29, 2023.
Rondineau et al., A Sliced Spherial Luneburg Lens. IEEE Antennas and Wireless Propagation Letters. 2003; 2:163-66.
U.S. Appl. No. 62/438,181. Method and Design for a Compact, Flat, Microwave Lens with Wide Angular Field of Regard and Wideband Operation. Filed Dec. 22, 2016.
Virtual Deposition of Anthony Teillet. *Masting, Inv.* v. *Isotropic Systems, Inc.* IPR Case No. IPR2022-01108/ U.S. Pat. No. 10,533,947 B2. Feb. 16, 2023.
Vo H, Development of an Ultra-Wideband Low-Profile Wide Scan Angle Phased Array Antenna. Dissertation. Ohio State University, 2015, 112 pages.
Weile et al., Genetic Algorithm Optimization Applied to Electromagnetics: A Review. IEEE Transactions on Antennas and Propagation. Mar. 1997;45(3). 11 Pages.
Final Written Decision. Inter Partes Review. *Masting, Inv.* v. *Isotropic Systems, Inc.* IPR Case No. IPR2022-01108/ U.S. Pat. No. 10,533,947 B2, dated Dec. 7, 2023, 105 pages.

* cited by examiner

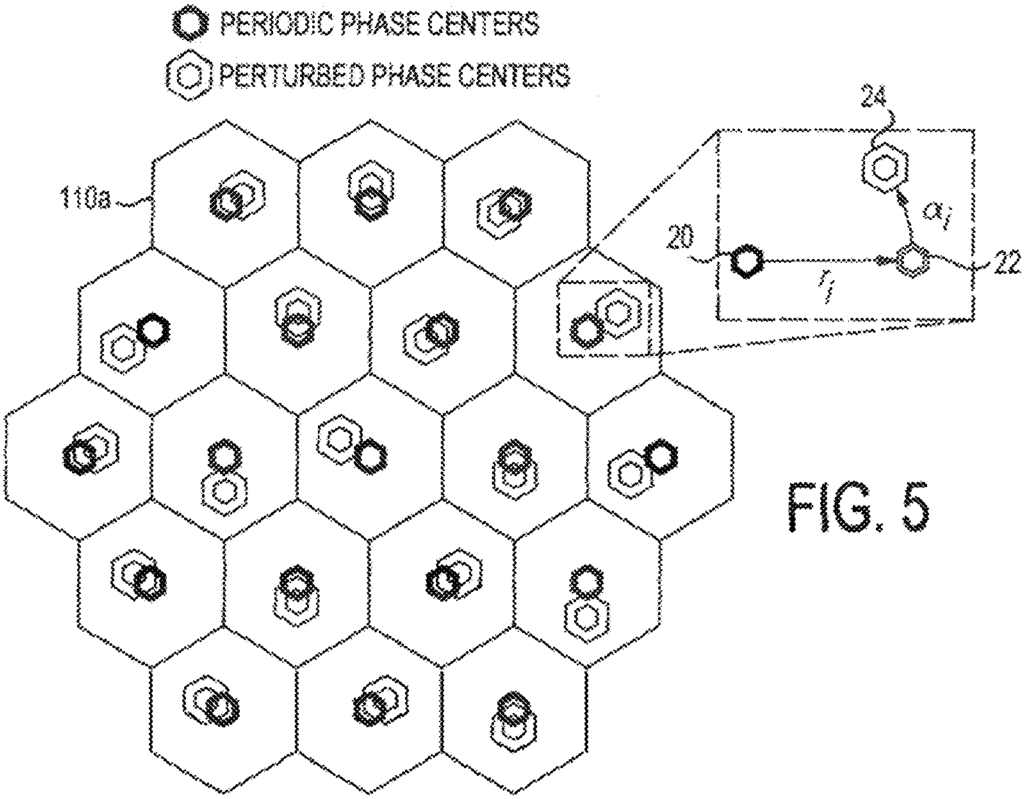
FIG. 5
FIG. 6a
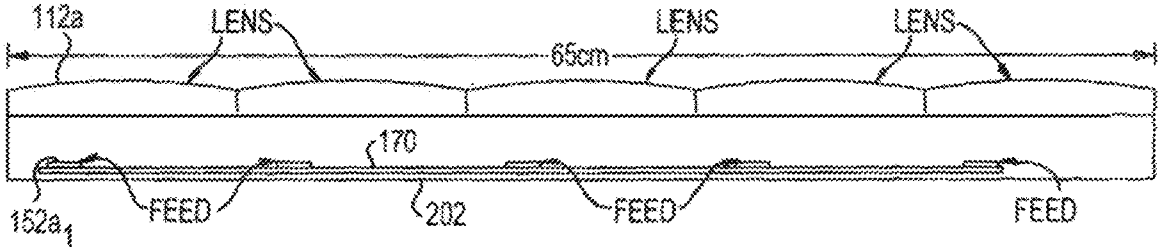
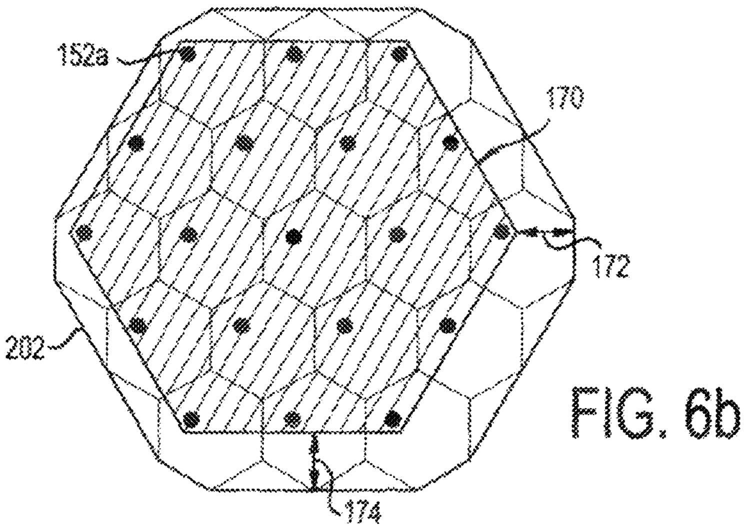
FIG. 6b

LENS ANTENNA SYSTEM

RELATED APPLICATIONS

This application is a continuation of U.S. application Ser. No. 16/726,342, filed Dec. 24, 2019, which is a continuation of U.S. application Ser. No. 16/173,985, filed on Oct. 29, 2018, which is a continuation of U.S. application Ser. No. 15/722,561, filed on Oct. 2, 2017, U.S. Pat. No. 10,116,051, which claims the benefit of U.S. Provisional Application No. 62/472,991, filed Mar. 17, 2017. The entire contents of each of the foregoing applications is incorporated herein by reference.

BACKGROUND OF THE INVENTION

Field of the Invention

The present invention relates to a multiple beam phased array antenna system. More particularly, the present invention relates to a broadband wide-angle multiple beam phased array antenna system with reduced number of components using wide-angle gradient index lenses each with multiple scannable beams.

Background of the Related Art

Phased arrays are a form of aperture antenna for electromagnetic waves that can be constructed to be low-profile, relatively lightweight, and can steer the resulting high-directivity beam of radio energy to point in a desired direction with electrical controls and no moving parts. A conventional phased array is a collection of closely-spaced (half-wavelength) individual radiating antennas or elements, where the same input signal is provided to each independent radiating element subject to a specified amplitude and a time or phase offset. The energy emitted from each of the radiating elements will then add constructively in a direction (or directions) determined by the time/phase offset configuration for each element. The individual antennas or radiating elements for such a phased array are designed such that the radiated energy angular distribution or pattern from each feed in the array mutual coupling environment, sometimes called the embedded element or scan element gain pattern, is distributed as uniformly as possible, subject to the physical limitations of the projected array aperture over a wide range of spatial angles, to enable the maximum antenna gain over the beam scanning angles. Examples of conventional phased arrays are described in U.S. Pat. Nos. 4,845,507, 5,283,587, and 5,457,465.

In comparison to other common methods of achieving high directivity radio beams, such as reflector antennas (parabolic or otherwise) and waveguide-based horn antennas, phased arrays offer many benefits. However, the cost and power consumption of an active phased array, namely one incorporating amplifiers at the elements for the reception and/or transmission functions, are proportional to the number of active feeds in the array. Accordingly, large, high-directivity phased arrays consume relatively large amounts of power and are very expensive to manufacture.

Phased arrays typically require that the entire aperture is filled with closely-spaced feeds to preserve performance over the beam steering range when using conventional approaches. Densely packing feeds (spaced approximately half of a wavelength at highest frequency of operation) is required to preserve aperture efficiency and eliminate grating lobes. Broadband phased arrays are constrained by the element spacing, aperture filling fraction requirements, and the types of circuits used for phase or time offset control, in addition to the bandwidth limitations of the radiating elements and the circuitry.

For example, an approximately square 65 cm 14.5 GHz Ku-band phased array that is required to steer its beam to about 70 degrees from the array normal or boresight would require more than 4000 elements, each with independent transmit (Tx)-and/or receive (Rx) modules, phase shifters or time delay circuits, and additional circuitry. All the elements must be powered whenever the terminal is operating, which introduces a substantial steady-state DC current requirement.

Every element or feed in an active phased array must be enabled for the array to operate, resulting in high power drain, e.g., 800 W or more for a 4000-element array, depending on the efficiency of the active modules. There is no ability to disable certain elements to reduce power consumption without dramatically impacting the array performance.

Various techniques have been developed in support of sparse arrays, where the element spacings can be as large as several wavelengths. Periodic arrays with large element spacings yield grating lobes, but appropriately choosing randomized locations for the elements breaks up the periodicity and can reduce the grating lobes. These arrays have found limited use, however, as the sparse nature of the elements leads to a reduced aperture efficiency, requiring a larger array footprint than is often desired. See Gregory, M. D., Namin, F. A. and Werner, D. H., 2013. "Exploiting rotational symmetry for the design of ultra-wideband planar phased array layouts." IEEE Transactions on Antennas and Propagation, 61(1), pp. 176-184, which is hereby incorporated by reference.

Another way to limit the effect of grating lobes is by using highly-directivity array elements, because the total array pattern is the product of the array factor, i.e. the pattern of an array of isotropic elements, and the element gain pattern. If the element pattern is very directive, this product suppresses most of the grating lobes outside the main beam region. An example is the Very Large Array (VLA). The VLA consists of many large, gimballed reflector antennas forming a very sparse array of highly directive elements (the reflectors), each with a narrow element pencil beam which dramatically reduces the magnitude of the sidelobes in the total radiation pattern from the array. See P. J. Napier, A. R. Thompson and R. D. Ekers, "The very large array: Design and performance of a modern synthesis radio telescope." Proceedings of the IEEE, vol. 71, no. 11, pp. 1295-1320, November 1983; and www.vla.nrao.edu/, which is hereby incorporated by reference.

SUMMARY OF THE INVENTION

The invention provides a family of phased array antennas constructed from a relatively small number of elements and components compared with a conventional phased array. The array uses a relatively small number of radiating elements, each of which is a relatively electrically large, e.g., 5 wavelengths, GRadient INdex (GRIN) lens, specially optimized, with at least one or multiple feed elements in its focal region. Each array element comprises the GRIN lens and one or more feed elements in the focal region of each lens. The lens-feeds set may have one or more beams whose element pattern directions may be varied or controlled to span the desired beam steering range or field of regard. In the case of one feed or cluster of feeds excited to operate as a single effective feed, the position of the feed or cluster may be physically moved relative to the focal point of the lens to effect beam steering. In the case of beam steering with no moving parts, a set of multiple feeds may be placed in the focal region of each lens and the selection (e.g. by switching) of the active feed or feed cluster produces an element beam that is directed to a specific beam direction. The specific structure of the GRIN lens can be optimized in a suitable manner, such as in accordance with the invention disclosed in Applicant's U.S. Provisional Application No. 62/438,181, filed Dec. 22, 2016, the entire contents of which are hereby incorporated by reference.

In one embodiment, the array would steer one or more beams over a specified angular range or field of regard with no moving parts by having multiple feeds in the focal region of each lens and selecting the active feed to steer the element beam. In another highly-simplified embodiment an array with minimal parts count could also be implemented by physically moving each feed element in the corresponding lens's focal region. In this simplified embodiment, the set of feed elements across the entire array could be moved together, such that only two actuators ganged across all the lenses are required, or with independent actuators for each lens for improved control. The overall array pattern is obtained by an antenna circuit and/or antenna processing device, which may combine the corresponding active feed elements at each lens with phase/time delay circuits and an active or passive corporate feed network.

The beam scanning performance of the array is controlled at two levels: coarse beam pointing and fine beam pointing. The coarse beam pointing of each lens is obtained by selecting a specific feed or small cluster of feeds excited to act as a single feed (or feed location) in the focal region of each lens. The lens and feed combination produces a directive but relatively broad beam consistent with the lens size in wavelengths and in a direction dependent on the displacement of the feed from the lens nominal focal point. By combining the corresponding feed elements in each lens of the array with appropriate phase shifts or time delays, fine control of beam pointing and high directivity due to the overall array aperture size is obtained. The set of feeds in the focal region of each lens for full electronic beam steering occupies only a fraction of the area associated with each lens so that the number of feeds and components is much lower compared with a conventional phased array. Furthermore, it is evident that, since power need be applied only to the active feeds, the power consumption of this array is substantially less than for a conventional phased array, which must have all its elements supplied with power. This specialized phased array design substantially reduces the total component count, cost, and power consumption compared with a conventional phased array with equivalent aperture size while maintaining comparable technical performance.

Furthermore, each lens and its multiple feed elements can form multiple beams simply by enabling and exciting separate feed elements in each lens with independent RF signals. Thus, the technology can be used with associated electronics for beam pointing control, and hardware and software interfaces with receive and transmit subsystems, allowing simultaneous one-way or two-way communications with one or more satellites or other remote communication nodes. The multiple beam capability along with reduced parts count and lower power consumption compared with a conventional phased array is particularly valuable in applications where it is desired to communicate with more than one satellite or, for example, to enable a "make-before-break" connection to non-geostationary satellites as they pass over the terminal. The relatively small number of components and the flexibility afforded by having the element patterns be directive and capable of being steered over a wide range of angles offers substantial cost savings. The individually scanning antenna elements (e.g., lenses) allow for wide field of regard and, even though grating lobes exist due to the large element spacing, the degrees of freedom afforded by optimizing the element positions and orientations and the beam directions and directivity of the elements allows minimizing magnitudes of the grating lobes in the radiation pattern(s) of the array.

The array of lenses is not a sparse array, as the lenses fill the aperture area of the array. The phase center of each lens may be offset slightly, which thus breaks up the periodicity of the entire array and reduces grating lobes while having relatively low impact on efficiency, in addition to the reductions afforded by the steerable element patterns.

The new phased array antenna system has an array of electrically-large, high-gain antenna elements, each element comprising a microwave lens which may be a gradient index (GRIN) lens with one or more feeds in its focal region. Each lens and feed subsystem can form multiple independent element patterns whose beams are steered according to the displacement of the feeds from the nominal lens focal point. Further, by combining and phasing the corresponding ports of a multiplicity of such lens and feed subsystems a high gain beam is formed with finely controlled beam direction. In this way, the antenna beam is scanned by first steering the element patterns for coarse pointing (via the lens set circuitry), and then fine-pointing the array beam using the relative phase or time delays to each feed (via the antenna circuitry). The antenna circuitry may use digital beam forming techniques where the signals to and from each feed are processed using a digital signal processor, analog-to-digital conversion, and digital-to-analog conversion. The electrically large element apertures are shaped and tiled to fill the overall array aperture for high aperture efficiency and gain. Furthermore, the array need not be planar but the lens/feed subsystems may be arranged on curved surfaces to be conformal to a desired shape such as for aircraft. The scanning, high-directivity elements require fewer active components compared with a conventional phased array, thereby yielding substantial cost and power savings. Furthermore, the array of lenses may be placed to form arrays of arbitrary form factors such as symmetrical or elongated arrays.

Furthermore, each lens can form simultaneous multiple beams by activating the appropriate feed elements. These feed elements may be combined with their own phasing or time delay networks or even with digital beam forming circuitry to form multiple high gain beams from the overall array. Design flexibility inherent in the extra degrees of freedom afforded by the lens and feed combinations along with the lens orientations and positions allows for grating lobe suppression as well as a broad field of view. The antenna system may be part of a communications terminal that includes acquisition and tracking subsystems that produce single or multiple beams covering a broad field of regard for such applications as satellite communications (Satcom) on-the-move (SOTM), 5G, broadband point-point or point-multipoint and other terrestrial or satellite communications systems. The antenna design with such lens naturally supports multiple simultaneous independently steerable beams. These simultaneous beams may be used for many applications such as: sensors for surveillance; reception of multiple transmission sources; multiple transmission beams; "make-before-break" links with non-geostationary, e.g., low earth orbit (LEO) or medium earth orbit (MEO) satellite constellations; and null placement for interference reduction without incurring the high cost of a conventional multi-beam phased array. Furthermore, the phased array antenna system can be used on spacecraft for single or multiple beam or shaped beam satellite applications.

These and other objects of the invention, as well as many of the intended advantages thereof, will become more readily apparent when reference is made to the following description, taken in conjunction with the accompanying drawings.

In addition to Phased Array incarnations, MIMO (multi-input multi-output) communication systems could also make use of the capability provided by a collection lenses and associated circuitry. Although the signal processing is different for a MIMO compared to a conventional phased array, both can make use of steered beams to enhance signal strength and improve communications in a noisy or interferer-filled environment.

BRIEF DESCRIPTION OF THE FIGURES

FIG. 5 is a top view of perturbed element phase centers for grating lobe control;

FIG. 6(*a*) is a side view of simplified beam steering by mechanically shifting the positions of a single feed element within each lens;

FIG. 6(*b*) is a top view of simplified beam steering of FIG. 6(*a*);

FIG. 9(*b*) is a block diagram for a transmit-only circuit for the lens feed;

DETAILED DESCRIPTION OF THE PREFERRED EMBODIMENTS

Figure 1:
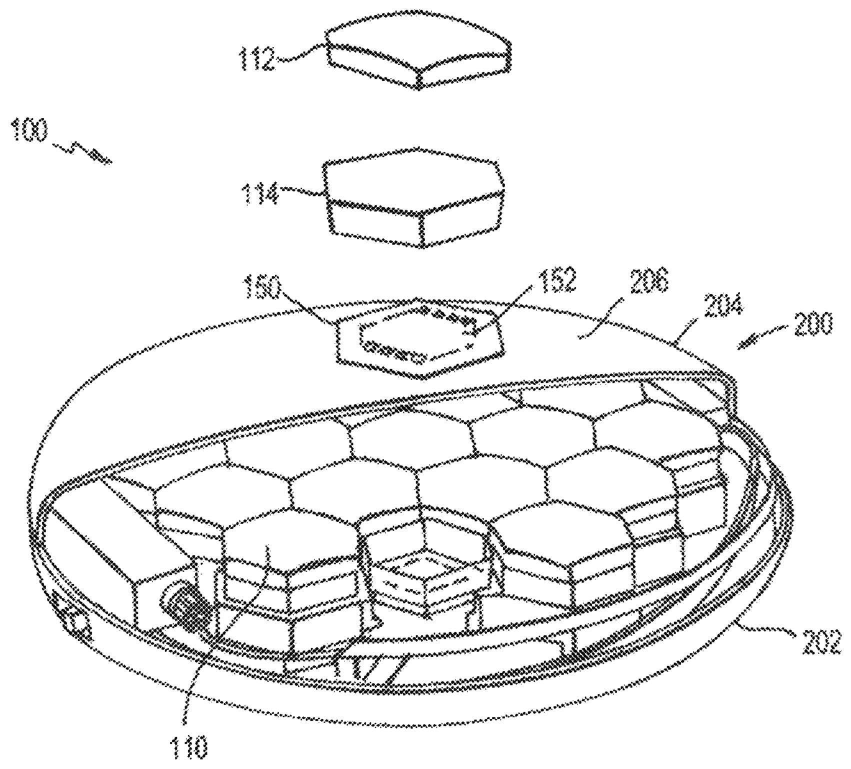
FIG. 1 is a cutaway perspective view of a multiple-beam phased array with electrically large multi-beam elements.

In describing the illustrative, non-limiting preferred embodiments of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several preferred embodiments of the invention are described for illustrative purposes, it being understood that the invention may be embodied in other forms not specifically shown in the drawings.

Turning to the drawings, FIG. 1 shows a lens array 100. The lens array 100 has a plurality of lens sets 110. Each lens set 110 includes a lens 112, spacer 114 and feed set 150 which has multiple feed elements 152, as shown by the one exploded lens set 110 for purposes of illustration. The spacer 114 separates the lens 112 from the feed set 150 to match the appropriate focal length of the lens. The spacer 114 may be made out of a dielectric foam with a low dielectric constant. In other examples, the spacer 114 includes a support structure that creates a gap, such as an air gap, between the lens 112 and the feed set 150. In further examples, the lens set 110 does not include the spacer 114. The feed element 152 may be constructed as a planar microstrip antenna, such as a single or multilayer patch, slot, or dipole, or as a waveguide or aperture antenna. While depicted as a rectangular patch on a multilayer printed-circuit board (PCB), the feed element 152 may have an alternate configuration (size and/or shape).

The PCB forming the base of the feed set 150 within each lens set further includes signal processing and control circuitry ("lens set circuit"). The feed elements 152 may be identical throughout the feed set 150, or individual feeds 152 within the feed set 150 may be independently designed to optimize their performance based on their location beneath the lens 112. The physical arrangement of the feed elements 152 within the feed set 150 may be uniform on a hexagonal or rectilinear grid, or may be nonuniform, such as on a circular or other grid to optimize the cost and radiation efficiency of the lens array 100 as a whole. The feed elements 152 themselves may be any suitable type of feed element. For example, the feed elements 152 may correspond to printed circuit "patch-type" elements, air-filled or dielectric loaded horn or open-ended waveguides, dipoles, tightly-coupled dipole array (TCDA) (see Vo, Henry "DEVELOPMENT OF AN ULTRA-WIDEBAND LOW-PROFILE WIDE SCAN ANGLE PHASED ARRAY ANTENNA." Dissertation. Ohio State University, 2015), holographic aperture antennas (see M. ElSherbiny, A. E. Fathy, A. Rosen, G. Ayers, S. M. Perlow, "Holographic antenna concept, analysis, and parameters", IEEE Transactions on Antennas and Propagation, Volume 52 issue 3, pp. 830-839, 2004), other wavelength scale antennas, or a combination thereof. In some implementations, the feed elements 152 each have a directed non-hemispherical embedded radiation pattern.

Signals received by the lens array 100 enter each lens set 110 through the respective lens 112, which focuses the signal on one or more of the feed elements 152 of the feed set 150 for that lens set 110. The signal incident to a feed element is then passed to signal processing circuitry (lens set circuitry, followed by the antenna circuitry), which is described below. Likewise, signals transmitted by the lens array 100 are transmitted from a specific feed set 150 out through the respective lens 112.

The number of electrical and radio-frequency components (e.g., amplifiers, transistors, filters, switches, etc.) used in the lens array 100 is proportional to the total number of feed elements 152 in the feed sets 150. For example, there can be one component for each feed element 152 in each feed set 150. However, there can be more than one component for each feed element 152 or there can be several feed elements 152 for each component.

As shown, each lens set 110 has a hexagonal shape, and is immediately adjacent to a neighboring lens set 110 at each side to form a hexagonal tiling. Immediately adjacent lenses 112 may be in contact along their edges. The feed sets 150 are smaller in area than the lenses 112 due to the lens-feed optics, and can be substantially the same shape or a different shape than the lenses 112. While described herein as hexagonal, the lens may have other shapes, such as square or rectangular that allow tiling of the full array aperture. The feed sets 150 may not be in contact with one another and thus may avoid shorting or otherwise electronically interfering with one another. Because of the optical nature of the element beams formed at each lens, the feed displacement to produce scanned element beams is always substantially less than the distance in the focal plane from the lens center to its edge. Therefore, the number of feeds necessary to "fill" the required scan range or field of regard is less than for an array which must have the total aperture area fully populated by feed elements.

In some implementations of the lens array 100, the feed sets 150 fill approximately 25% of the area of each lens 112. The lens array 100 maintains similar aperture efficiency and has a total area similar to a conventional phased array of half-wavelength elements but with substantially fewer elements. In such implementations, the lens array 100 may include approximately only 25% of the number of feed elements as the conventional phased array in which the feed sets 150 fill 100% of the area of the lens array 100. Because the number of electrical and radio-frequency components used in the lens array 100 is proportional to the total number of feed elements 152 in the feed sets 150, the reduction of the number of feed elements 152 also reduces the number and complexity of the corresponding signal processing circuit components (amplifiers, transistors, filters, switches, etc.) by the same fraction. Furthermore, since only the selected feeds in each lens need be supplied with power, the total power consumption is substantially reduced compared with a conventional phased array.

As shown, the lens array 100 may be situated in a housing 200 having a base 202 and a cover or radome 204 that completely enclose the lens sets 110, feed sets 150, and other electronic components. In some implementations, the cover 204 includes an access opening for signal wires or feeds. The housing 200 is relatively thin and can form a top surface 206 for the lens array 100. The top surface 206 can be substantially planar or slightly curved. The lens sets 110 can also be situated on a substrate or base layer, such as a printed circuit board (PCB), that has electrical feeds or contacts that communicate signals with the feed elements 152 of the feed sets 150. The lens sets 110 may be arranged on the same plane, offset at different heights, or be tiled conformally across a nonplanar surface.

Figure 2:
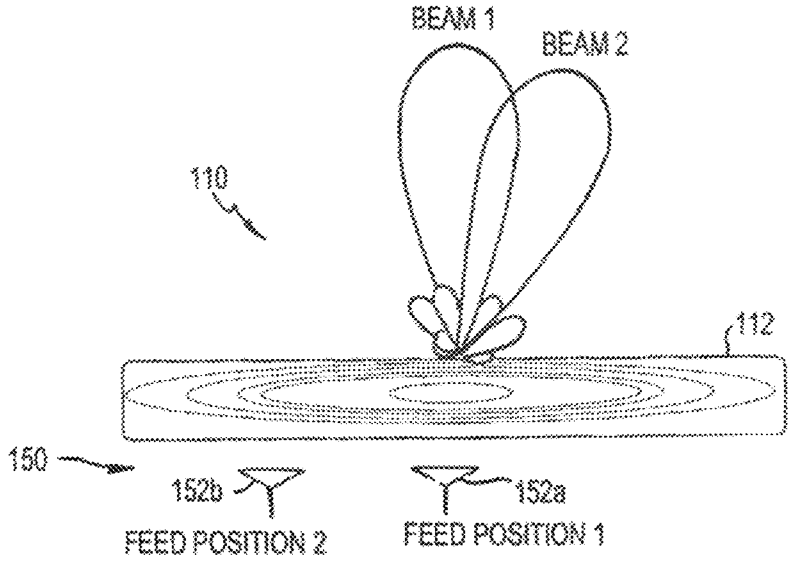
FIG. 2 is a side view of a moderate-gain lens and feed elements scanning their radiation patterns by feed selection for coarse pattern control.

FIG. 2 illustrates a lens set 110 having a lens 112 with multiple feed elements 152. Only two feed elements 152*a*, 152*b* are shown here for clarity but a typical feed cluster might have, for example, 19, 37, or more individual feeds. Each feed element 152 produces a relatively broad beam via the lens 112 at a specific angle depending on the feed element's displacement from the nominal focal point of the lens 112. In the example illustrated in FIG. 2, the first feed element 152*a* is directly aligned with the focal point of the lens 112 and generates a Beam 1 that is substantially normal to the lens 112 or the housing top surface 206, and the second feed element 152*b* is offset from the focal point of the lens 112 and generates a Beam 2 that is at an angle with respect to the lens 112 normal or the housing top surface 206. Accordingly, selectively activating one of the feed elements 152*a*, 152*b* enables the lens set 110 to generate a radiation pattern in a desired direction (i.e., to beam scan by feed selection). Therefore, the lens set 110 may operate in a wide range of angles.

Figure 3:
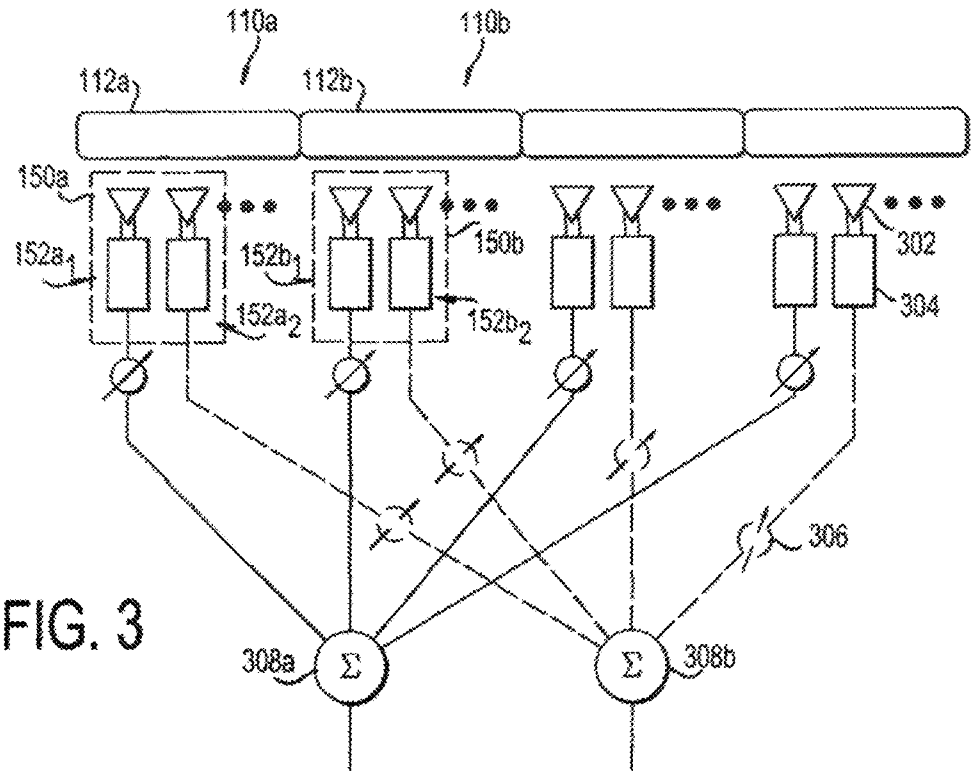
FIG. 3 is a block diagram of a multiple beam array of lens-feed elements phased to form multiple beams at desired scan angles with selected antenna elements.

FIG. 3 shows a simplified phased array having a lens array with multiple lens sets 110 and feed sets 150. Each lens set 110*a*, 110*b* has a lens 112*a*, 112*b* that is aligned with a respective feed set 150*a*, 150*b*, and each feed set 150*a*, 150*b* has multiple feed elements 152*a*, 152*b*. Each feed element 152 includes an antenna 302 and a sensing device 304, such as a reader or detector, connected to the antenna 302. The sensing device 304 is connected to a shifter 306 (time and/or phase), which is connected to a summer/divider 308. The shifter 306 provides a desired time and/or phase shift appropriate to the associated feed element 152. Each summer/divider 308 is connected to a respective one of the feed elements 152 in each of the feed sets 150. That is, corresponding feed elements 152 for each lens 112 are combined (or divided) in a phasing or time delay network. Accordingly, a first summer/divider 308*a* is connected to a first feed element 152$a_1$ of the first feed set 150*a* and a first feed element 152$b_1$ of the second feed set 150*b*, and a second summer/divider 308*b* is connected to a second feed element 152$a_2$ of the first feed set 150*a* and a second feed element 152$b_2$ of the second feed set 150*b*. Each signal passes through the shifter 306 before or after being summed or divided by the summer/divider 308. Each summer/divider circuit 308 may be directly connected (e.g., through the shifter 306) to a specific feed element 152 within each feed set 150 or may connected through a switching matrix to allow dynamic selection of a particular desired feed 152 from each lens set 110.

The circuitry within the sensing device 304 included in each feed element 152 may contain amplifiers, polarization control circuits, diplexers or time division duplex switches, and other components. Further, the sensing device 304 may be implemented as discrete components or integrated circuits. Further yet, the sensing device 304 may contain up- and down-converters so that the signal processing may take place at an intermediate frequency or even at baseband. While only a single phasing network is shown here for each beam to keep the drawing from being too cluttered, it is understood that, for each beam, a transmit phasing network and a receive phasing network may be employed. For some bands, such as Ku-band, it may be possible to employ a single time delay network that will serve to phase both the transmit and receive beam, keeping them coincident in angle space over the entire transmit and receive bands. Such broadband operation could also be possible over other Satcom bands. The figure shows how two simultaneous beams may be formed by having two such phasing networks. Extensions to more than two simultaneous beams should be evident from the description.

In operation, a signal received by the first lens 112*a* passes to the respective feed set 150*a*. The signal is received by the antennas 302 and circuits 304 of the first feed set 150*a* and passed to the shifters 306. Thus, the first feed element 152$a_1$ receives the signal and passes it to the first summer/divider 308*a* via its respective shifter 306, and the second feed element 152$a_2$ receives the signal and passes it to the second summer/divider 308*b* via its respective shifter 306. The second lens 112*b* passes the signal to its respective feed set 150*b*. The first feed element 152$b_1$ receives the signal and passes it to the first summer/divider 308*a* via its respective shifter 306, and the second feed element 152$b_2$ receives the signal and passes it to the second summer 308*b* via its respective shifter 306.

Signals are also transmitted in reverse, with the signal being divided by the summer/divider 308 and transmitted out from the lenses 112 via the shifters 306 and feed sets 150*a*. More specifically, the first divider 308*a* passes a signal to be transmitted to the first feed elements 152*a*$_1$, 152*b*$_1$ of the first and second feed sets 150*a*, 150*b* via respective shifters 306. And the second divider 308*b* passes the signal to the second feed elements 152*a*$_2$, 152*b*$_2$ of the first and second feed sets 150*a*, 150*b* via respective shifters 306. The feed elements 152*a*$_1$, 152*a*$_2$ of the first feed set 150*a* transmit the signal via the first lens 112*a* and the feed elements 152*b*$_1$, 152*b*$_2$ of the second feed set 150*b* transmit the signal via the second lens 112*b*.

Accordingly, the first summer/divider 308*a* processes all the signals received/transmitted over the first feed element 152 of each respective feed set 150, and the second summer/divider 308*b* processes all the signals received/transmitted over the second feed element 152 of each respective feed set 150. Accordingly, the first summer/divider 308*a* may be used to form beams that scan an angle associated with the first feed elements 152*a*, and the second summer/divider 308*b* may be used to form beams that scan an angle associated with the second feed elements 152*b*.

Accordingly, FIG. 3 illustrates an example in which a feed element or a plurality of feed elements included in a lens set of a phased array is selectively activated based on a position of the feed element relative to a lens of the lens set. Therefore, a beam produced by the lens set may be adjusted without any moving parts and therefore without introducing gaps between the lens and other lenses of the array.

Figure 4:
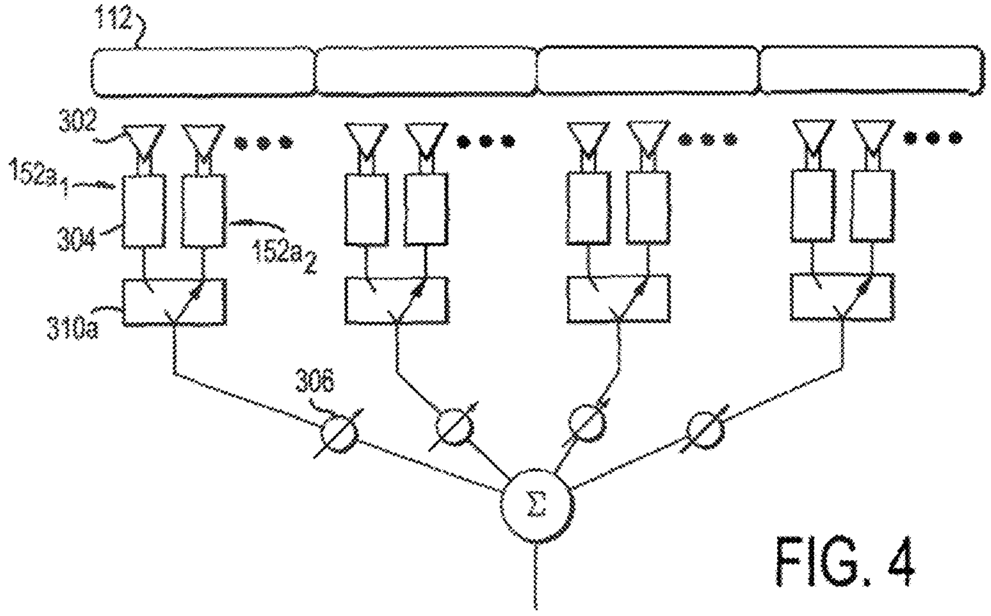
FIG. 4 is a block diagram of a lens array with single beam and switched feed selection.

FIG. 4 illustrates how one beam phasing/time delay circuit can be used to form a single beam by incorporating one or more switches 310 at each lens 112 to select the appropriate feed element for coarse pointing and then phasing the lens feeds for fine beam pointing achieving the high directivity of the overall array. The switch 310 is coupled between the detector or sensing device 304 and the shifter 306, which may be for example a time delay circuit or a phase shift circuit. Accordingly, the signals received over the first and second feed elements 152*a*$_1$, 152*a*$_2$ share a shifter 306. The switch 310 selects which of the feed elements 152*a*$_1$, 152*a*$_2$ to connect to the shifter 306, for receiving signals and/or for transmitting signals. In one example embodiment of the invention, all of the switches 310 can operate to simultaneously select the first feed element 152*a*$_1$, 152*b*$_1$ (or the second feed element 152*a*$_2$, 152*b*$_2$) of each of the feed sets 150*a*, 150*b* and pass signals between the first feed elements 152*a*$_1$, 152*b*$_1$ (or the second feed element 152*a*$_2$, 152*b*$_2$) and the summer/divider 308. Thus, the switches 310 enable one summer/divider 308 to support multiple feed elements. The shifter 306 is also controlled at the same time to provide the appropriate shift for the selected feed element 152.

In the examples of FIG. 3 and FIG. 4, coarse beam pointing of each lens 112 is obtained by the lens set circuitry selecting a specific feed element 152 (or feed location) in the focal region of each lens 112. The lens and feed combination produces a relatively broad beam consistent with the lens size in wavelengths. The direction of the beam is based on the displacement of the feed element 152 from a nominal focal point of the lens 112. By antenna circuitry combining the corresponding feed elements 152 in each lens set 110 with appropriate phase shifts or time delays, fine control of beam pointing and high directivity due to the overall array aperture size is obtained. The fine pointing of the overall array beam is accomplished with appropriate settings of the time delay or phasing circuits in accordance with criteria well known in the art for either analog or digital components. For digital time delay or phasing circuits, for example, the appropriate number of bits is chosen to achieve a specified array beam pointing accuracy.

Accordingly, FIG. 4 illustrates another example in which a feed element or a plurality of feed elements included in a lens set of a phased array is selectively activated based on a position of the feed element relative to a lens of the lens set. Therefore, a beam produced by the lens set may be adjusted without any moving parts and therefore without introducing gaps between the lens and other lenses of the array to allow for lens motion.

FIG. 5 depicts an optimized placement of the positions of the phase center of each lens set 110 to affect the symmetry/periodicity of the array 100 and thereby minimize grating lobes. Each lens 112 has a geometric center ("centroid") as well as a phase center. For lenses that are cylindrically symmetric, although the phase center is not necessarily collocated with the axis of symmetry for all scanning angles, an offset of the axis of symmetry of a particular distance and angle in the plane of the lens will correspond to the offset of the same distance and angle of the phase center, relative to the original configuration. In this way, the phase center of the lens may be adjusted by changing the location of the lens's axis of symmetry relative to the lens centroid. The phase center corresponds to a location from which spherical far-field electromagnetic waves appear to emanate. The phase center and geometric center of a lens may be independently controlled, and the phase center, not the geometric center, of each lens 112 determines a degree of grating lobe reduction.

Accordingly, a phase center 24 of each lens 112 is perturbed by optimized distances $r_i$ and rotation angles $\alpha_i$ of the lens axis of symmetry from a geometric center 20 (i.e., the unperturbed phase center) which would typically have been tiled on a uniform hexagonal or rectangular grid. The specific optimized placement of the lens axis of symmetry can be determined by any suitable technique, such as described in the Gregory reference noted above. The position of the lens axis of symmetry determines the phase center. According to the methods in the Gregory reference, for example, disturbing the periodicity of the array by small amounts in this manner suppresses the grating lobes. This process functions because grating lobes are formed by the formation of a periodic structure, which is known as a grating. By eliminating the periodicity between elements, there is no longer a regular grating structure, and grating lobes are not formed. The number of lenses, the shape or boundary of the array, the number of feeds, or the location of the feeds beneath the lens do not change the principles of this mitigation strategy.

FIG. 6 depicts a version of the lens array 100 with a relatively low parts count where only one feed element 152 per lens is included per lens set. In the example illustrated in FIG. 6, each feed element is mechanically moved over the short range of focal distances in each lens to effect beam steering. FIG. 6(*a*) depicts a side view of the lens array 100 and FIG. 6(*b*) depicts a top down view of the lens array 100. A positioning system is provided that includes a feed support 170 and one or more actuators. The feed support 170 can be a flat plate or the like that has a same or different shape as the housing 200 and is smaller than the housing 200 so that it can move in an X- and Y-direction and/or rotate within the housing 200. The lens sets 110 are positioned over the combined feed support 170 so that the feed assembly (i.e., the feed support 170 and the feed elements 152) can be moved independently of the lenses 112. In this embodiment, the feed support 170 is not directly connected to, but is only adjacent to or in contact with, the lens spacer 114 or the lenses 112. The set of feeds 152 mounted to the feed support 170 are moved relative to the lenses to effect coarse beam scanning and the feeds are phased/time delayed to produce the full array gain and fine pointing. In the non-limiting embodiment shown, a first linear actuator 172 is connected to the support 170 to move the support 170 in a first linear direction, such as the X-direction, and a second linear actuator 174 is connected to the support 170 to move the support 170 in a second linear direction, such as the Y-direction relative to the stationary lenses. Other actuators can be provided to move the support 170 up/down (for example in FIG. 6(*a*)) with respect to the lenses 112, rotate the support 170, or tilt the support 170.

A controller can further be provided to control the actuators 172, 174 and move the feed elements 152 to a desired position with respect to the lenses 112. Though the support 170 is shown as a single board, it can be multiple boards that are all connected to common actuators to be moved simultaneously or to separate actuators so that the individual boards and lens sets 110 can be separately controlled. Accordingly, FIG. 6 illustrates an example in which an active feed element included in a lens set of a lens array is repositioned relative to a lens of the lens set without moving the lens. Therefore, a beam produced by the lens set may be adjusted without moving the lens and introducing gaps between the lens and other lenses of the phased array.

Figure 7:
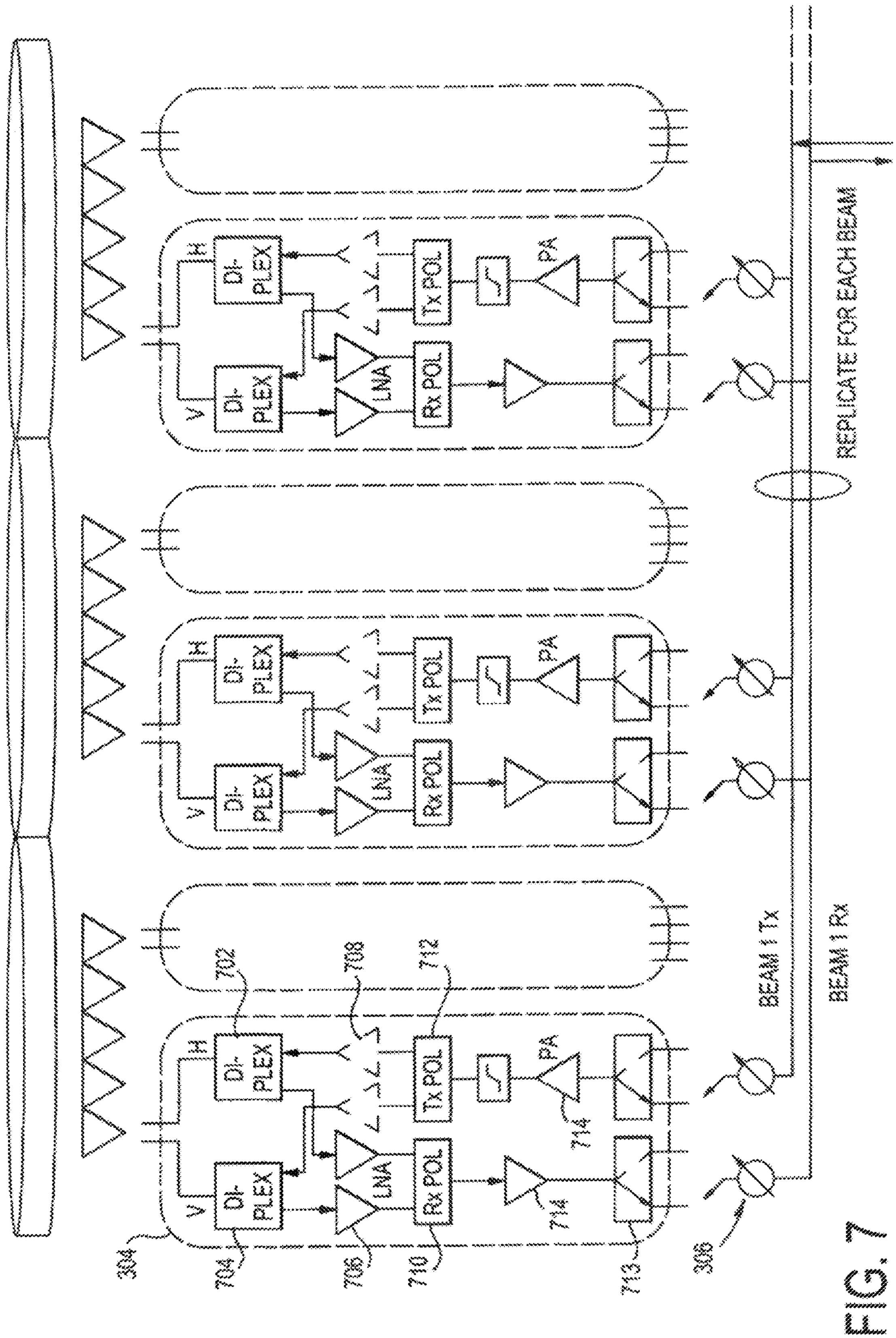
FIG. 7 is a functional block diagram of transmit-receive circuit for dual linear polarization lens feed.

FIG. 7 shows representative circuit diagrams for simultaneous transmit (Tx) and receive (Rx) in the same aperture including dual linear polarization tilt angle control as would be required for Ku-band geostationary Satcom applications. The beam phasing circuits at the bottom can be replicated for each independent simultaneous beam. FIG. 7 illustrates independent signal paths within the lens set circuitry 304 and separate shifters 306 for the receive and transmit operation of the system. While not illustrated, the receive and transmit operations may further have separate associated summers/dividers 308. In the illustrated example, the detector 304 in each feed element 152 includes separate diplexers 702 and 704 for horizontal and vertical polarized feed ports of the detector 304 to separate high-power transmit and low-power receive signals. The receive signal passes from the diplexers 702 and 704 to the low-noise amplifier 706, 706, a polarization tilt circuit 710, 712, an additional amplifier 714, and the feed-select switch 716 before reaching the shifter 306. The transmit signal from the shifter 306 passes through the switch 716, the amplifier 714, a polarization tilt circuit 712, 710, and a final power amplifier 708, 706 before being fed into the two diplexers 702 and 704, respectively.

Figure 8:
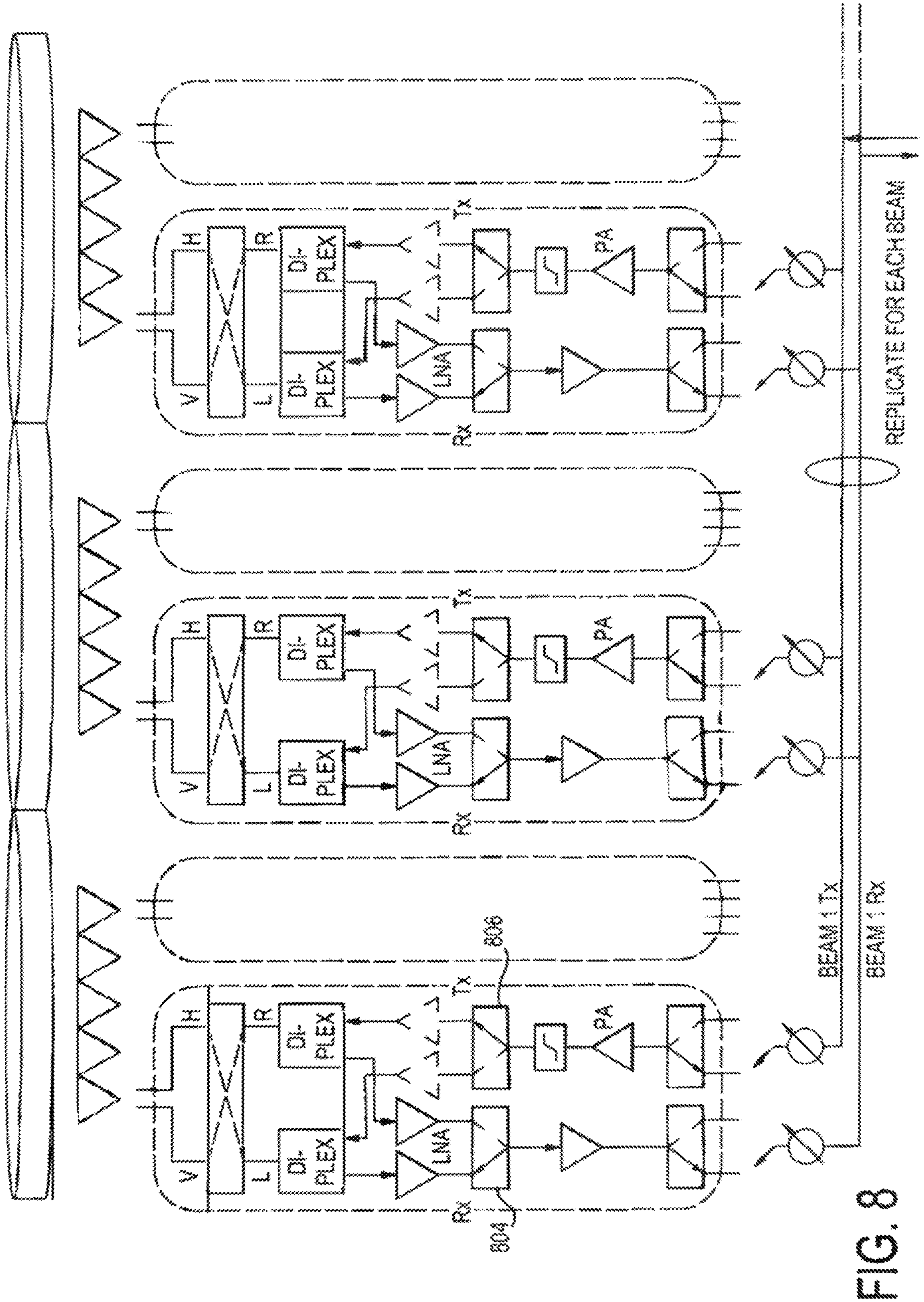
FIG. 8 is a block diagram of transmit-receive circuit for dual circular polarization lens feed.

FIG. 8 is a representative circuit diagram for a lens array of dual circularly polarized elements such as may be used for K/Ka-band commercial Satcom frequencies. FIG. 8 shows a similar diagram to FIG. 7, except for a change in operation of the polarization circuits 710, 712. K/Ka Satcom operation requires circular polarization, rather than tilted linear polarization as required for Satcom operation at Ku. Right-hand circularly-polarized or left-hand circularly-polarized signals may be achieved with a simple switch 804 for the receive and 806 for the transmit channels controlling which port is excited in a circular polarizer circuit or waveguide component, as compared to the complex magnitude and phase vector adding circuits 710 and 712 to achieve a linear polarized signal with an arbitrary tilt angle. The remaining aspects of the diagram are the same as in FIG. 7. Variations of this circuit may be understood by those skilled in the art. For example, feeding the two orthogonal linear polarization components of the feed using a hybrid coupler or an incorporated waveguide polarizer and orthogonal mode transducer (OMT) can provide simultaneous dual polarizations instead of switched polarizations.

Figure 9A:
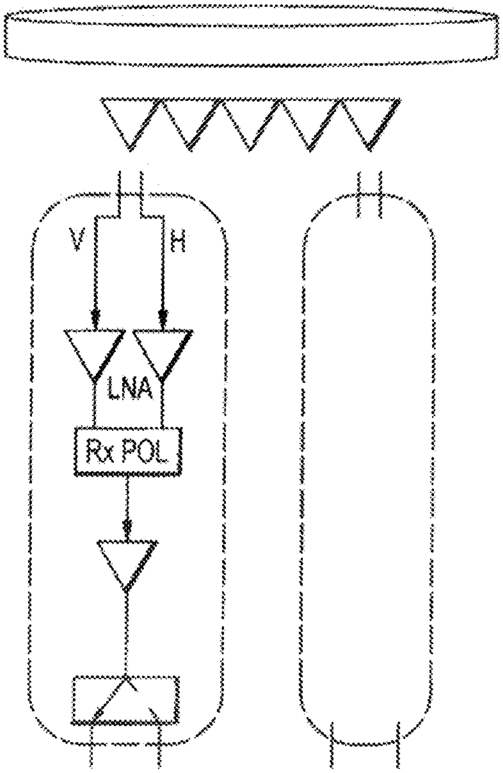
FIG. 9(*a*) is a block diagram for a receive-only circuit for the lens feed.
Figure 9B:
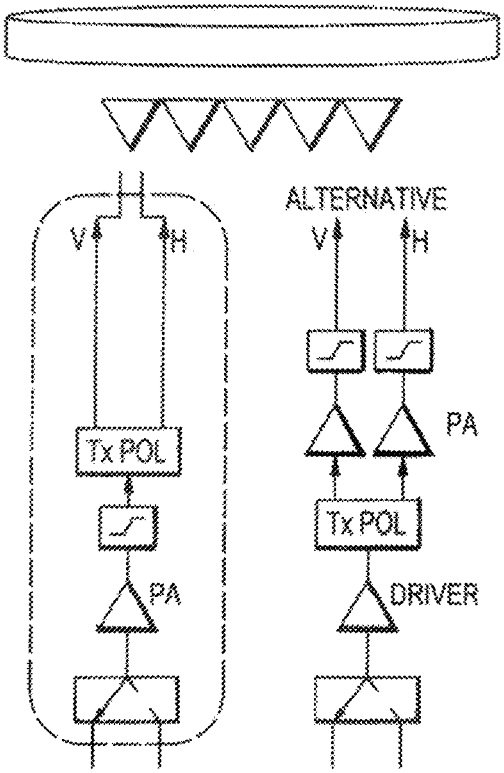

FIG. 9 illustrates representative lens set circuitry for receive-only and transmit-only applications. FIG. 9(*a*) illustrates a receive-only antenna and FIG. 9(*b*) illustrates a transmit only antenna. The receive and transmit diplexers 702 and 704 are not required for a receive-only or transmit-only antenna, since the receive and transmit signals are not connected to the same feed element and do not need to be separated. The remaining aspects of FIG. 9(*a*) and FIG. 9(*b*) remain substantially the same as FIGS. 7-8.

Figure 10:
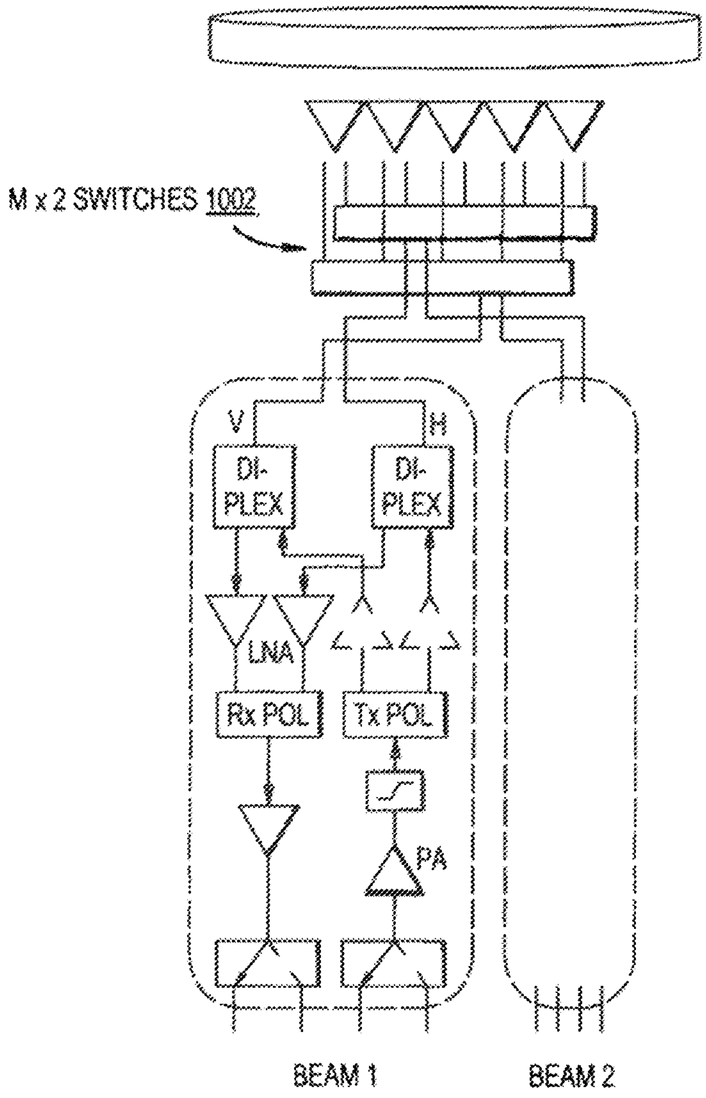
FIG. 10 is a functional block diagram for switch circuit to select feed.

FIG. 10 shows a further simplification and reduction in parts count by incorporating low-loss multi-port switches 1002 to select the appropriate feed element. The use of low-loss multi-port switches allows multiple feed elements to share a single set of power amplifiers, low-noise amplifiers, phase shifters, and other feed circuitry. In this way, the number of required circuit components is reduced while maintaining the same number of feed elements behind the lens. A larger switching matrix allows more feed elements to share the same feed circuitry, but also increases the insertion loss of the system, increases the receiver noise temperature, and decreases the terminal performance. A balance between the additional losses incurred by an additional level of switching, which generally (although not necessarily) is a two-to-one switch, must be balanced against the cost and circuit area of the additional receive and transmit circuits required when it is omitted.

Figure 11:
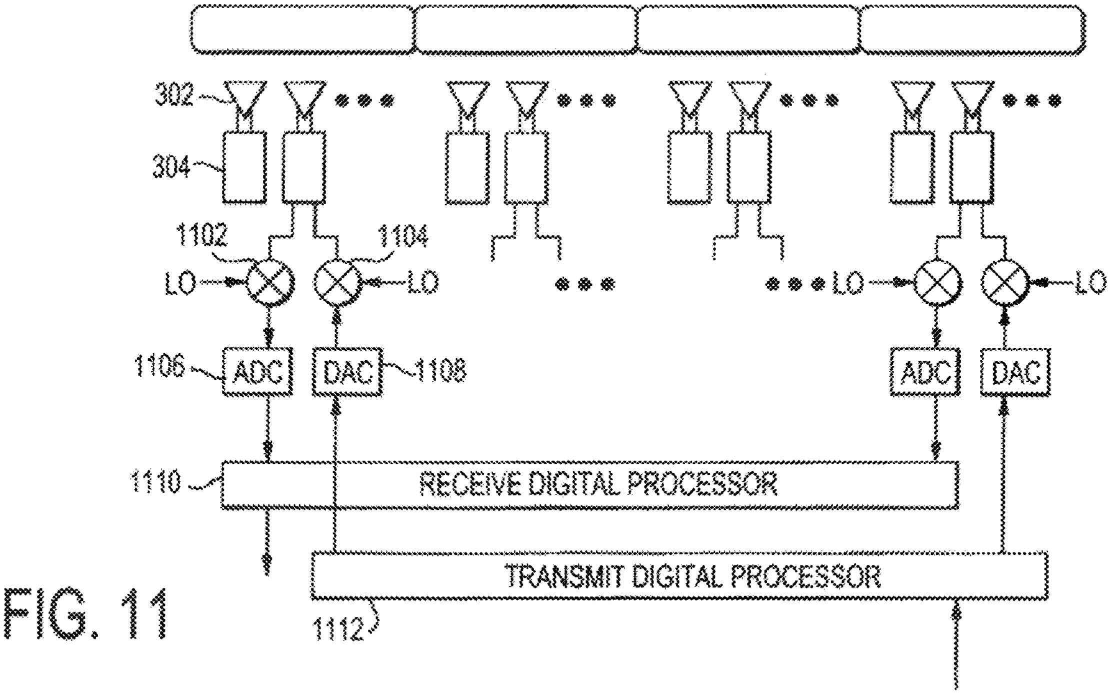
FIG. 11 is a functional block diagram for circuit implementation in the digital domain for digital beam processing.

FIG. 11 depicts a simplified digital beamforming (DBF) arrangement. The detector 304 is connected to a down-converter 1102. An Analog-to-Digital converter (ADC) 1110 is connected to the down-converter 1102. The detector 304 transmits a signal received via the antenna 302 to the down-converter 1102, which down-converts the signal. The down-converter 1102 transmits the down-converted received signal to the ADC 1106. The ADC 1106 digitizes the received signal and forms a beam in the digital domain, thereby obviating the need for analog RF phase or time delay devices (i.e., the shifter 306 of FIGS. 2-3 need not be provided). The digitized signal is then transmitted to a Receive Digital Processor 1110 for processing of the signal.

A corresponding process is provided to transmit a signal over the array. A Transmit Digital Processor 1112 sends the signal to be transmitted to a Digital-to-Analog Converter (DAC) 1108. The DAC 1108 converts low frequency (or possibly baseband) bits to an analog intermediate frequency (IF) and is connected to a mixer 1104. The mixer 1104 up-converts the signal from the DAC 1108 to RF, amplifies the signal for transmit, and sends the signals to the feed elements with the appropriate phase (e.g., selected by the transmit digital processor 1112) to form a beam in the desired direction. Many variations evident to those skilled in the art may be employed while maintaining the unique features of the invention.

Figure 12:
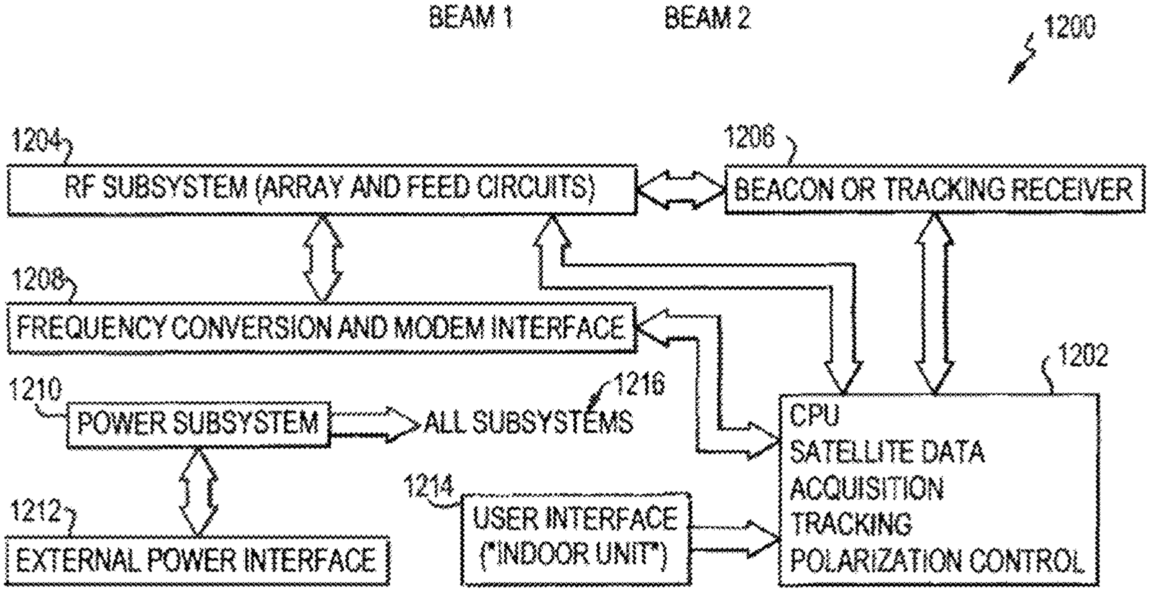
FIG. 12 is a system diagram for a Satcom terminal.

FIG. 12 is a simplified functional collection of subsystems that allow a lens array antenna to be incorporated in a fully functional tracking terminal for Satcom-on-the-move or for tracking non-geostationary satellites. Here, a system 1200 includes a processing device 1202 such as a Central Processing Unit (CPU), beacon or tracking receiver 1206, Radio Frequency (RF) Subsystem 1204, Frequency Conversion and Modem Interface 1208, Power Subsystem 1210, External Power Interface 1212, User Interface 1214, and other subsystems 1216. The RF Subsystem 1204 array may include any of the array and feed circuits of FIGS. 1-11 as described herein. The processing device 1202, beacon or tracking receiver 1206, modem interface 1208, power subsystem 1210, external power interface 1212, user interface 1214, and other subsystems 1216 are implemented as in any standard SATCOM terminal, using similar interfaces and connections to the RF subsystem 1204 as would be used by other implementations of the RF subsystem, such as a gimbaled reflector antenna or conventional phased array antenna. As shown, all the components 1202-1214 can communicate with one another, either directly or via the processing device 1202. Accordingly, FIG. 12 illustrates one context in which multiple beam phased array antenna systems, as described herein, may be integrated.

Figure 13:
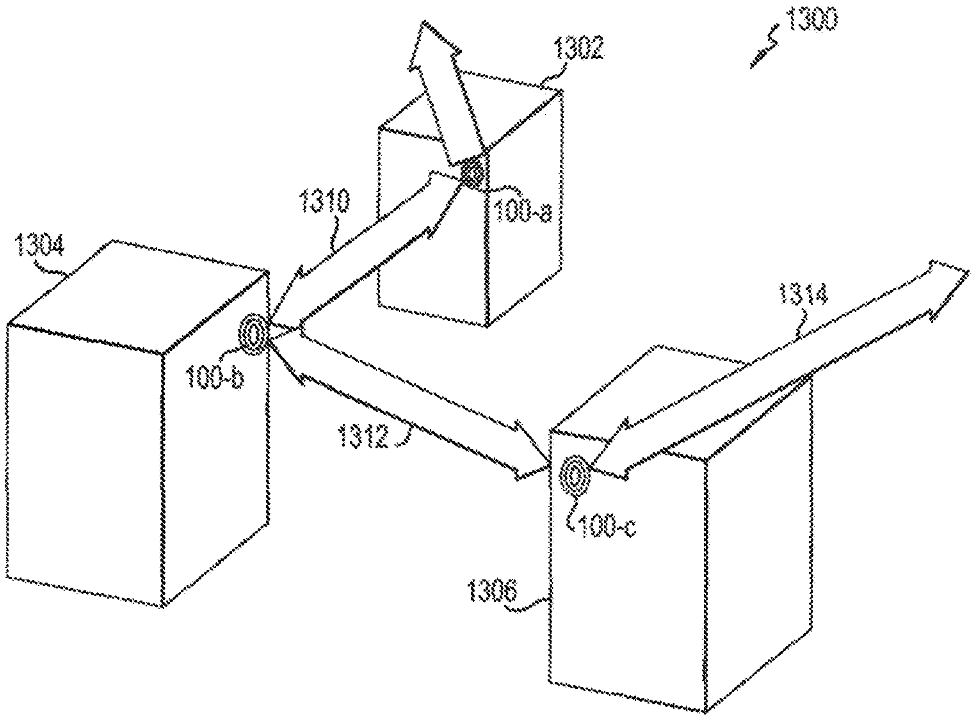
FIG. 13 is a diagram for a wireless point-to-multipoint terrestrial terminal.

FIG. 13 demonstrates the use of multiple lens-based antenna terminals in a terrestrial context. Based on dynamic, real-time conditions and communication demands, the terminals can re-point their beams to establish simultaneous communications with multiple targets to form a mesh or self-healing network. In such a network, multiple antenna terminals 100*a-c* located on locations 1302, 1304 and 1306, which may be buildings, towers, mountains, or other mounting locations can dynamically establish point-point high-directivity communication links 1310, 1312, and 1314 shown as broad bidirectional arrows between themselves in response to communication requests or changing environmental conditions. For example, if antennas 100*a* and 100*b* are communicating over link 1310, but the link is interrupted, the communications path can reform using links 1312 and 1314 using antennas 100-*b* and 100-*c*. This allows the use of highly-directional antennas in a mesh network, which will improve signal-to-noise ratio, power levels, communication range, power consumption, data throughput, and communication security compared to a mesh network composed of conventional omnidirectional elements.

Advantages of the Invention

An embedded element radiation pattern is the radiation pattern produced by an individual element in a phased array while in the presence of the other elements of the phased array. Due to interactions between the elements (e.g., mutual coupling), this embedded radiation pattern differs from the pattern the element would have if the element were isolated or independent of the other elements. Given the embedded radiation element pattern(s) of one or more elements of the phased array, the radiation pattern of the array as a whole may be computed (e.g., using pattern multiplication). In typical phased arrays, the element pattern has a fixed beam direction. The phased array according to the present disclosure includes elements (e.g., lenses, aperture antennas) that may have steerable radiation patterns.

The lens array 100 includes elements that are electrically large compared to the half-wave elements used in conventional phased arrays, and implemented in such a way that the radiation pattern of each element may be steered to point broadly in the direction of desired beam scanning. An embedded element radiation pattern and beam direction of each lens 112 (e.g., an array element) of the lens array 100 is determined by the location of the corresponding active feed element 152 relative to the focal point of the lens 112. Accordingly, the array 100 has a flexible radiation pattern.

Any kind of lens may be used in the array 100, such as a homogeneous dielectric lens, inhomogeneous gradient-index dielectric lens, a lens composed of metamaterial or artificial dielectric structures, a substantially flat lens constructed using one or more layers of a metasurface or diffraction grating, flattened lenses such as Fresnel lenses, hybrid lenses constructed from combinations of metamaterial and conventional dielectrics, or any other transmissive device that acts as a lens to collimate or focus RF energy to a focal point or locus. In some embodiments, movement of the location of the active feed element 152 is achieved without moving parts using a cluster of multiple independently-excited feeds 152 that is scanned by changing which of the feeds 152 is excited, as explained above with reference to FIGS. 3 and 4. Alternatively, the same effect can be achieved with only a single feed 152 behind each lens 112 with an actuator 172 and/or 174 to move the element 152 relative to the lens 112, and thus change beam direction of the element pattern, as explained above with reference to FIG. 6. Each lens 112 can have an independent pair of actuators 172, 174, or a single pair of actuators could move the feeds of all lenses together.

Therefore, using relatively electrically large lenses as elements of a phased array enables the phased array to have a tunable or scannable element pattern. Further, using lenses as elements of the phased array enables an entire array aperture may to be covered by radiating sub-apertures (e.g., the lenses). This may increase aperture efficiency and gain of the array antenna.

Another benefit of using lenses with steerable beams as elements of a phased array is that a phased array that includes lenses as elements may include fewer electrical and RF components as compared to a conventional phased array. In an illustrative example, the phased array 100 includes 19 lens sets 110 (i.e., elements) having a diameter of 13 cm each and arranged in a hexagonal tiling pattern to efficiently fill an overall aperture that is roughly equivalent in performance to a 65 cm diameter phased array. The area behind each lens 112 may be only partially covered or filled by the feed elements 152, whereas in a conventional phased array, the entire surface of the aperture of the phased array may be covered with feed elements. Further the feed elements 152 may be no more densely packed than in the conventional phased array (e.g., half-wave). Accordingly, the phased array 110 may include fewer feed elements as compared to the conventional phased array. Since each feed element in either the conventional or lens-based phased array includes associated circuitry (e.g., the detector 304), reducing the number of feed elements may reduce the number of circuits included in the phased array 100. In addition, because only one feed element 152 may be active at a time per lens 112 to generate a beam, some embodiments of the lens array 100 allows circuits, such as the shifter 306, to be shared by multiple feed elements 152, as described with reference to FIG. 4. Accordingly, the lens array 100 may include a further reduced number of circuits. In an example, 4000 shifters required in a 4000-element conventional phased array may be reduced to as few as 19 shifters 306 in the preferred embodiment (i.e., one for each of the lenses 112). Therefore, the phased array 110 in this example may have fewer electrical and RF components as compared to a conventional phased array with the typical half-wave feed elements.

Further, the lens array 100 may consume less power as compared to a conventional phased array. In an illustrative example, the lens array 100 operates at a transmit RF power of 40 W (46 dBm). The total transmit power is distributed over the lens modules 110 of the lens array 100 (i.e., the elements of the phased array), where in each of the lens modules 110 a single feed element 152 is activated to create a single beam. As described above, one embodiment of the lens array 100 includes 19 lens modules 110. For this reason, it is necessary for each feed element 152 to handle about 1/19 of the total 40 W power (i.e., slightly more than 2 W or 33 dBm). The unused feed elements 152 in each of the lens sets 110 may be turned off and need not dissipate any quiescent DC power for either the receive or transmit circuitry. Accordingly, the lens array 100 may consume less power as compared to a conventional phased array in which each feed element is activated. In an example of the lens array 100, each of the lens sets 110 includes between 20 and 60 independent feed elements 152 behind the lens 112. A receive-only implementation of the lens array 100 may be expected to consume less than 10% of the DC power of the equivalent conventional receive-only phased array aperture.

The beamforming system for the lens array 100 may include the feed element 152 switches 1002 and 716, the shifters 306, the summation/dividers 308, the processing device 1202, or a combination thereof. To generate a beam in a desired direction, the processing device 1202 selects positions of an active feed element for each lens set 110 and computes the appropriate phase or time delay for each lens set 110. The time/phase delay and power combination/division may be performed before or after the upconversion/downconversion step at the RF, IF, or Baseband. The processing device 1202 sets the positions of the active feed elements by sending control signals to activate one of the feed elements 152 for each of the lens sets 110 or by sending control signals to adjust positions of the feed elements 152 using one or more of the actuators 172, 174. The processing device 1202 further sends one or more control signals to one or more of the switches 1002, 716, the shifters 306, the summation/dividers 308, or a combination thereof to set the time/phase delay and power combination/division for each lens set 110.

While GRIN lenses are the preferred embodiment for many applications, the lenses 112 need not be GRIN. For example, in applications that deal with a limited field of regard or limited bandwidth, smaller homogeneous lenses may suffice. Also, in some circumstances, metamaterial lenses or flat lenses composed of metasurfaces or artificial dielectrics may be optimal. Generally, inhomogeneous lenses designed according to the optimization method of application Ser. No. 62/438,181 will provide better radiation patterns over any given beam steering or scanning range (particularly as the scanning angle increases past 45 deg), and shorter focal lengths than homogeneous lenses, and will provide better broadband frequency responses than metamaterial or metasurface-based lenses.

Satellite communications antennas must limit their sidelobe power spectral density (PSD) envelopes to meet Federal Communications Commission (FCC) and International Telecommunication Union (ITU) standards. This requires careful control of sidelobes. However, for the lens array with electrically large lens sets 110 as described herein, grating lobes are created when sidelobe energy from all the lens sets 110 constructively interferes in an undesired direction. However, the high-directivity of the radiation patterns of the lens sets 110 may reduce many of the effects of the grating lobes, since the directivity of the lens radiation patterns, which is multiplied by the array factor, drops off quickly, unlike the response of a conventional array.

Ordinarily, the use of a high-directivity array element (e.g., lens) to mitigate the effect of grating lobes would result in a very narrow scanning range within the angular width of the array radiation pattern. However, allowing the lens sets 110 themselves to scan their embedded element patterns across the desired field of view preserves both the scanning performance and radiation pattern profile of the original antenna. Additional mitigation of the grating lobes may be obtained by perturbing the locations of the phase centers to break the symmetry of the regular grid of lens sets 110, as described with reference to FIG. 5.

Breaking the symmetry (periodicity) of the lens sets 110 positions in two or three dimensions reduces the degree to which the energy will constructively interfere in any direction. Furthermore, the location of the phase centers of the lens sets 110 may be arranged on a nonuniform, aperiodic grid to minimize the effect of grating lobes. The physical locations of the phase centers in one, two, or three dimensions are randomized and/or optimized to minimize the grating lobes and improve the radiation pattern. The phase centers may be selected by a stochastic optimizer in either an arbitrary or pseudo-ordered fashion as a part of the terminal design process. The lens sets 110 are constructed such that their physical center and phase center (generally coincident with the axis of symmetric within the lens) are spatially separated, where each lens in the lens set 100 may have a different offset between the phase and physical center, as described with reference to FIG. 5.

Many variants of optimization methods may be applied to the reduction of grating lobes. As an example, the (x, y) location of the axis of symmetry of each lens 112 with respect to the geometric center of the lens set 110 when in its proper location of the periodically-tiled phased array 100 is encoded as a constant in a hexagonal or rectangular lattice with a variable offset. The offset may be encoded in two variables for Cartesian, cylindrical, or some other convenient coordinate system. A stochastic optimization algorithm (such as Genetic Algorithm, Particle Swarm, or Covariance Matrix Adaptation Evolutionary Strategy, among others) coupled with a software routine for predicting the array factor and resulting array pattern from a combination of embedded lens radiation patterns and lens set 110 locations is then used to select the specific parameterized offsets for the phase center of each lens 112 element, as controlled by the axis of symmetry of each lens 112 element. The axis of symmetry location, and thus the phase center locations, are fixed when the array is manufactured, and does not vary during operation. The small offset of the axis of symmetry from the geometric center of the lens introduces only a small difference in coarse beam-pointing angle between adjacent lens sets 112 (which can be corrected for by corresponding small changes in the location of the feed array 150 beneath the lens set 112), and the same feeds 152 can be selected between adjacent lens sets 112 to point the coarse beam in the desired direction for the entire array. In all of these cases, the space occupied by the lens sets 112 do not change, but the location of their axis of symmetry does change to control the phase center. As described herein, the lens array 100 may offset the phase center of the lens 112 without changing the geometric center (centroid) of the lens set 110 or introducing gaps in an aperture of the lens array 100 (e.g., using the actuator(s) 172, 174.

The optimizer can minimize the grating lobes via the array factor alone, or can apply the embedded element (e.g., lens set) radiation patterns to the array factor and optimize the radiation pattern sidelobes directly. Considering the array pattern directly requires more sophisticated multi-objective optimization strategies A hybrid approach involves constructing a worst-case mask that the array factor must satisfy to guarantee that the sidelobes will satisfy the regulatory masks at all angles and frequencies.

The size of the lens 112 is a trade of cost vs. performance and complexity. Increasing the size of the individual lens 112 reduces the number of elements in the phased array, thus simplifying the circuitry, but also increases the lens set 110-lens set 110 separation distance, the magnitude of the grating lobe problem, and the cost and complexity of each individual feed element 152. Reducing the size of the individual elements increases the number of lens sets 110, but reduces the grating lobes, and the cost and complexity of each feed element 152 and lens set 110.

The use of electrically-large phased array elements (e.g., lens sets) with individually electrically-scanned patterns may be worthwhile if the element has much lower cost for a given aperture size compared to the cost of the conventional phased array elements that would otherwise fill that area and produce similar antenna terminal performance. For a switched-feed scanning lens antenna, the cost of the lens itself is relatively small and the cost of the array antenna may be proportional to the number of feed elements and their circuitry.

In some examples of the phased array 100, only a fraction of the area (25-50%) behind the lens 112 in each lens set 110 is populated with feed elements 152, and the feed elements 152 may be separated by more than half of a wavelength. For this reason, when considering a given aperture area that can be covered by a lens set 110, the cost for the lens set 110 can be much smaller when compared to the equivalent phased array that includes relatively more feed elements.

Each feed element 152 behind a given lens 112 is associated with a particular set of circuits depending on the application of the array as a whole. The simplest case is either a receive-only or transmit-only single-polarization circuit. A controllable polarization circuit for operation in Ku-band tilted Horizontal/Vertical polarized SATCOM, or a circular polarizer for K/Ka SATCOM, together with a dual-polarized feed antenna 152, can be used to support either mobile operation or polarization-independent operation.

Combined receive/transmit operation in a single terminal can be performed with an active transmit/receive switch for time-division duplexing, or by using a diplexer circuit element for frequency-division duplex operation, as described with reference to FIGS. 7, 8, and 10. The diplexer element increases the cost and complexity of each element, but there is a significant advantage to using only a single combined receive/transmit aperture rather than two separate apertures.

The lens array 100 may include a single shifter 306 in each lens set 110 for each supported simultaneous beam, rather than one for each feed element 152 as would be required in a conventional phased array, as described with reference to FIG. 4. In some examples where the low loss multi-port switches 1002 correspond to a low-loss N:1 switch, a single detector 304 is included in each lens set 110, and the power is switched between the set of all feed elements 152 behind the lens 112 using the low loss multi-port switches 1002. There is a trade-off between acceptable switching losses and the number of detectors 304 for each lens to maximize performance while minimizing cost. The performance, availability and relative cost of the switching circuit 1002 and detector 304 dictates the appropriate number of feed elements to be switched into a single detector 304 for a given application.

Due to the relatively large element separation of the lens sets 110 and the relatively small number of lens sets 110 in the lens array 100, the shifters 306 may have relatively higher discretization as compared to those of a standard phased array. For example, the shifters 306 may correspond to 8-bit or higher number of bits time delay units, rather than the 4 or 6-bit time delay units of a typical conventional phased array. However, due to the relatively small number of lens sets 110 and associated shifters/time delay units 306 in the phased array 100, the additional resolution of the shifters 306 may not represent a significant cost.

In contrast with other large-element phased arrays, such as the Very Large Array of Napier (27 gimbaled reflector antennas, each 25 m in diameter), the lens array 100 of lens sets 110 proposed herein can support multiple simultaneous beams in nearly arbitrary directions within a field of regard. This is implemented by exciting two or more separate feed elements 152 behind each lens 112 with a separate input signal and time offset unique to each lens set 110. Since each feed element 152 of a single lens 112 will radiate an independent beam, an array of lens sets 110 can generate independent high-directivity beams.

In contrast with conventional phased arrays, the array 100 of lenses 112 herein can support multiple beams with a minimum of added circuitry, while a conventional (analog) phased array would replicate the entire feed network for each beam. Since only one feed element 152 and one phase shifter 306 is activated to produce a single, beam, two independent beams may be included by adding one layer of additional switches, and one additional phase shifter 306 to each lens set 110.

The lens array 100 is described as a ground terminal for satellite communications, and could be used for both stationary and mobile ground terminals. In this communication mode, potential mounting and applications may include schools, homes, businesses, or NGOs, private or public drones, unmanned aerial systems (UAS), military, civilian, passenger, or freight aircraft, passenger, friend, leisure, or other maritime vehicles, and ground vehicles such as buses, trains, and cars. The lens array 100 as described can also be applied for the space segment of a satellite communication system as an antenna on a satellite for multiple spot beams and/or shaped beams, for dynamically-reconfigurable point-point terrestrial microwave links, cellular base stations (such as 5G), and any other application that requires or is benefited by dynamic multiple beamforming.

The lens array antenna terminals may be used for stationary or mobile applications where the angular field of regard requires the beam or multiple beams to be formed over relatively wide spatial angles. For example, for a Satcom terminal atop an aircraft it is desirable that the range of angles beat least 60 degrees and even 70 degrees or more to ensure that the antenna can communicate with geostationary satellites at various orbital locations relative to the aircraft. For non-geostationary satellite systems, the beam or beams must be able to track the satellites as they pass overhead, whether the terminal is stationary, e.g. atop a building or on a tower, or mobile such as on a vehicle. In both cases the range of angles depends on the number and locations of the satellites and the minimum acceptable elevation angle from the terminal to the satellite. Therefore, antenna systems must generally have a broad field of regard or the range of beam steering angles.

It is further noted that the description uses several geometric or relational terms, such as thin, hexagonal, hemispherical and orthogonal. In addition, the description uses several directional or positioning terms and the like, such as below. Those terms are merely for convenience to facilitate the description based on the embodiments shown in the figures. Those terms are not intended to limit the invention. Thus, it should be recognized that the invention can be described in other ways without those geometric, relational, directional or positioning terms. In addition, the geometric or relational terms may not be exact because of, for example, tolerances allowed in manufacturing, etc. And, other suitable geometries and relationships can be provided without departing from the spirit and scope of the invention.

As described and shown, the system and method of the present invention include operation by one or more circuits and/or processing devices, including the CPU 1202 and processors 1110, 1112. For instance, the system can include a lens set circuit and/or processing device 150 to adjust embedded radiation patterns of the lens sets, for instance including the components of 304 and associated control circuitry; and an antenna circuit and/or processing device to adjust the antenna radiation pattern, which may take the form of a beamforming circuit and/or processing device such as 306 and 308, or their digital alternatives as in 1102, 1104, 1106, 1108, 1110, and 1112, and the antenna circuitry may include additional components such as 1202, 1206, and 1208. It is noted that the processing device can be any suitable device, such as a chip, computer, server, mainframe, processor, microprocessor, PC, tablet, smartphone, or the like. The processing devices can be used in combination with other suitable components, such as a display device (monitor, LED screen, digital screen, etc.), memory or storage device, input device (touchscreen, keyboard, pointing device such as a mouse), wireless module (for RF, Bluetooth, infrared, Wi-Fi, etc.). The information may be stored on a computer hard drive, on a CD ROM disk or on any other appropriate data storage device, which can be located at or in communication with the processing device. The entire process is conducted automatically by the processing device, and without any manual interaction. Accordingly, unless indicated otherwise the process can occur substantially in real-time without any delays or manual action.

The system and method of the present invention is implemented by computer software that permits the accessing of data from an electronic information source. The software and the information in accordance with the invention may be within a single, free-standing processing device or it may be in a central processing device networked to a group of other processing devices. The information may be stored on a chip, computer hard drive, on a CD ROM disk or on any other appropriate data storage device.

Within this specification, the terms “substantially” and “relatively” mean plus or minus 20%, more preferably plus or minus 10%, even more preferably plus or minus 5%, most preferably plus or minus 2%. In addition, while specific dimensions, sizes and shapes may be provided in certain embodiments of the invention, those are simply to illustrate the scope of the invention and are not limiting. Thus, other dimensions, sizes and/or shapes can be utilized without departing from the spirit and scope of the invention. Each of the exemplary embodiments described above may be realized separately or in combination with other exemplary embodiments.

The foregoing description and drawings should be considered as illustrative only of the principles of the invention. The invention may be configured in a variety of shapes and sizes and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A satellite communication terminal, comprising:

a substantially flat support;

a plurality of feed clusters disposed in a two-dimensional arrangement on the substantially flat support; and a plurality of lenses disposed on the substantially flat support over respective feed clusters of the plurality of feed clusters, wherein each lens of the plurality of lenses has a phase center, and wherein the phase centers of the plurality of lenses form an aperiodic arrangement, wherein the substantially flat support is a substantially flat printed circuit board, and wherein each feed cluster of the plurality of feed clusters includes a plurality of feeds arranged in a two-dimensional layout on the substantially flat printed circuit board, and wherein the two-dimensional layout of the plurality of feeds occupies between 25% and 50% of an area behind the respective lens.

2. The satellite communication terminal of claim 1, wherein the aperiodic arrangement is a random arrangement such that the phase centers of the plurality of lenses form the random arrangement.

3. The satellite communication terminal of claim 1, wherein the plurality of feeds of the two-dimensional layout are sparsely spaced.

4. The satellite communication terminal of claim 3, wherein the lenses of the plurality of lenses are electrically large.

5. The satellite communication terminal of claim 4, wherein the lenses have a substantially flat surface proximate the respective feed cluster and a curved surface distal the respective feed cluster.

6. The satellite communication terminal of claim 1, wherein the lenses of the plurality of lenses are electrically large and the plurality of feed clusters include feed elements that are sparsely spaced.

7. The satellite communication terminal of claim 1, further comprising a housing enclosing the substantially flat support, the plurality of feed clusters, and the plurality of lenses.

8. The satellite communication terminal of claim 7, wherein the housing has a substantially circular contour and comprises a substantially planar or slightly curved top surface adjacent the plurality of lenses.

9. The satellite communication terminal of claim 8, wherein the two-dimensional arrangement is a non-square arrangement.

10. The satellite communication terminal of claim 9, further comprising control circuitry coupled to the plurality of feed clusters and configured to control individual feeds within the plurality of feed clusters.

11. The satellite communication terminal of claim 10, wherein the control circuitry is disposed on the substantially flat support and configured to control the plurality of feed clusters to generate at least two distinct beams substantially simultaneously.

12. A satellite communication terminal, comprising:

a substantially flat support;

at least twelve feed clusters disposed in a two-dimensional arrangement on the substantially flat support; and a respective lens disposed over each of the at least twelve feed clusters such that the at least twelve feed clusters are between the substantially flat support and the respective lenses, wherein each respective lens has a phase center, and wherein the phase centers of the respective lenses form an aperiodic arrangement, wherein at least one of the at least twelve feed clusters comprises a feed layout occupying between 25% and 50% of an area behind the respective lens.

13. The satellite communication terminal of claim 12, wherein the respective lenses are electrically large and wherein feeds of respective feed clusters of the at least twelve feed clusters are sparsely spaced.

14. The satellite communication terminal of claim 13, wherein the feeds are arranged in a hexagonal or rectilinear grid.

15. The satellite communication terminal of claim 14, wherein the respective lenses form at least part of a circular pattern.

16. The satellite communication terminal of claim 12, further comprising control circuitry coupled to the at least twelve feed clusters and configured to control individual feeds within the at least twelve feed clusters.

17. The satellite communication terminal of claim 12, wherein feeds of each of the at least twelve feed clusters are individually addressable.

* * * * *